United States Patent
Sagi

(10) Patent No.: US 8,032,717 B2
(45) Date of Patent: Oct. 4, 2011

(54) MEMORY CONTROL APPARATUS AND METHOD USING RETENTION TAGS

(75) Inventor: Shigekatsu Sagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 145 days.

(21) Appl. No.: 11/298,445

(22) Filed: Dec. 12, 2005

(65) Prior Publication Data

US 2006/0168404 A1  Jul. 27, 2006

(30) Foreign Application Priority Data

Jan. 24, 2005 (JP) .................. 2005-015722

(51) Int. Cl.
 G06F 12/00 (2006.01)
 G06F 13/00 (2006.01)
 G06F 13/28 (2006.01)
(52) U.S. Cl. ...................................... 711/146
(58) Field of Classification Search .............. 711/139, 711/146
See application file for complete search history.

(56) References Cited

U.S. PATENT DOCUMENTS

| | | | |
|---|---|---|---|
| 5,522,058 A | 5/1996 | Iwasa et al. | |
| 2004/0186964 A1* | 9/2004 | Dieffenderfer et al. | 711/146 |
| 2005/0044320 A1* | 2/2005 | Olukotun | 711/118 |
| 2005/0091457 A1* | 4/2005 | Auld et al. | 711/128 |

FOREIGN PATENT DOCUMENTS

| | | |
|---|---|---|
| EP | 0 481 233 A2 | 4/1992 |
| EP | 0 507 063 A1 | 10/1992 |
| JP | 06-110844 | 4/1994 |
| JP | 2000-298653 | 10/2000 |

OTHER PUBLICATIONS

European Search Report issued Apr. 2, 2009 in corresponding European Patent Application 05256412.7.

* cited by examiner

*Primary Examiner* — Kevin Ellis
*Assistant Examiner* — Chad L Davidson
(74) *Attorney, Agent, or Firm* — Staas & Halsey LLP

(57) ABSTRACT

A data storage control apparatus and method for reduction of traffic of an interconnect occurring in the timing of a cache miss within a CPU. The apparatus and method are realized by utilizing, as a response to the read request from the CPU, data tags DTAGs used for management of data registered to the cache memory within the CPU under the control of a local node and a retention tag used for holding secondary data indicating that the object data is not held in the cache memory of any CPU of a local node.

26 Claims, 19 Drawing Sheets

MEMORY CONTROL APPARATUS AND METHOD USING RETENTION TAGS

CROSS-REFERENCE TO RELATED APPLICATIONS

This application is based upon and claims priority to Japanese Patent Application No. 2005-15722, filed on Jan. 24, 2005, the contents being incorporated herein by reference.

FIELD OF THE INVENTION

The present invention relates to a memory control apparatus and a memory control method for ensuring consistency of cache memories in a multi-processor system. Consistency is ensured by making access to retention tags as exclusive tag memories for holding the separate data.

The separate data held by the exclusive tag memories indicates that specific data blocks of main memories under the control of a local node are not held in any of secondary cache memory before execution of broadcasts. The broadcasts can be to the local node and to other nodes in response to the memory access request from a CPU. The CPU can be in a memory control apparatus such as a system control LSI or the like, which can perform control of common data between main memories and cache memories within the CPU. Such control can occur using data tags provided for management of data registered in the cache memories within the CPU under the control of the local node by forming chip sets such as server and PC or the like.

BACKGROUND OF THE INVENTION

In a computer system of the background art, a hierarchical structure of memories within the CPU, including the cache memories and main memories has mainly been formed in three-stage layers. The layers are typically formed of a primary cache memory comprised within the CPU, secondary cache memory externally provided to the CPU, and a main memory.

Thereafter, high density packing of LSI has become possible due to the progress of semiconductor technology. Moreover, it has also become possible to comprise a secondary cache memory into the CPU through outstanding improvement in the number of transistors which may be packed onto the LSI. In addition, the memory control apparatus often includes the data tag (hereinafter referred to as DTAG) used for management of data registered to the secondary cache memory of the CPU under the control of the local node.

Particularly, in a computer system such as a server or the like, which is requested to have specially higher processing capability for the fundamental businesses in a certain company, the memory access time has been shortened. The processing capability has also been improved by making access to the DTAG from a plurality of processors with realization of a high performance computer system such as a large-scale Symmetrical Multi-Processor (SMP) structure or the like.

A memory access request is typically issued to the main memory from the CPU and an I/O apparatus in a high performance computer system such as the large-scale SMP structure or the like. A global snoop is then executed by broadcasting such a memory access request via an interconnect. The global snoop is for connecting the memory control apparatuses such as the system controller LSI or the like. e The DTAG registered to the secondary cache memory of the CPU under the control of the local node (in the memory control apparatus such as the system controller LSI or the like) can then be simultaneously snooped.

Thereafter, each memory control apparatus such as a system controller LSI or the like in each node executes a merge of cache status. The merge can be executed by concentrating a search result of the DTAG through repeated transmission and reception there of via the interconnect. In accordance with the result of merging of the cache status, process contents for the access request such as the read request to the data in the main memory and the purge request to the CPU of the data in the secondary cache memory are determined.

Accordingly, since all memory access requests among the nodes in the system are issued via the interconnect, deterioration of performance in the system as a whole is caused. For example, throughput or bandwidth of the interconnect can be insufficient for generation of memory access in the system as a whole. Moreover, propagation time on the interconnect also can give an adverse effect on the system performance because latency is added to the memory access time.

EXAMPLE OF STRUCTURE IN THE BACKGROUND ART

Figure 1:
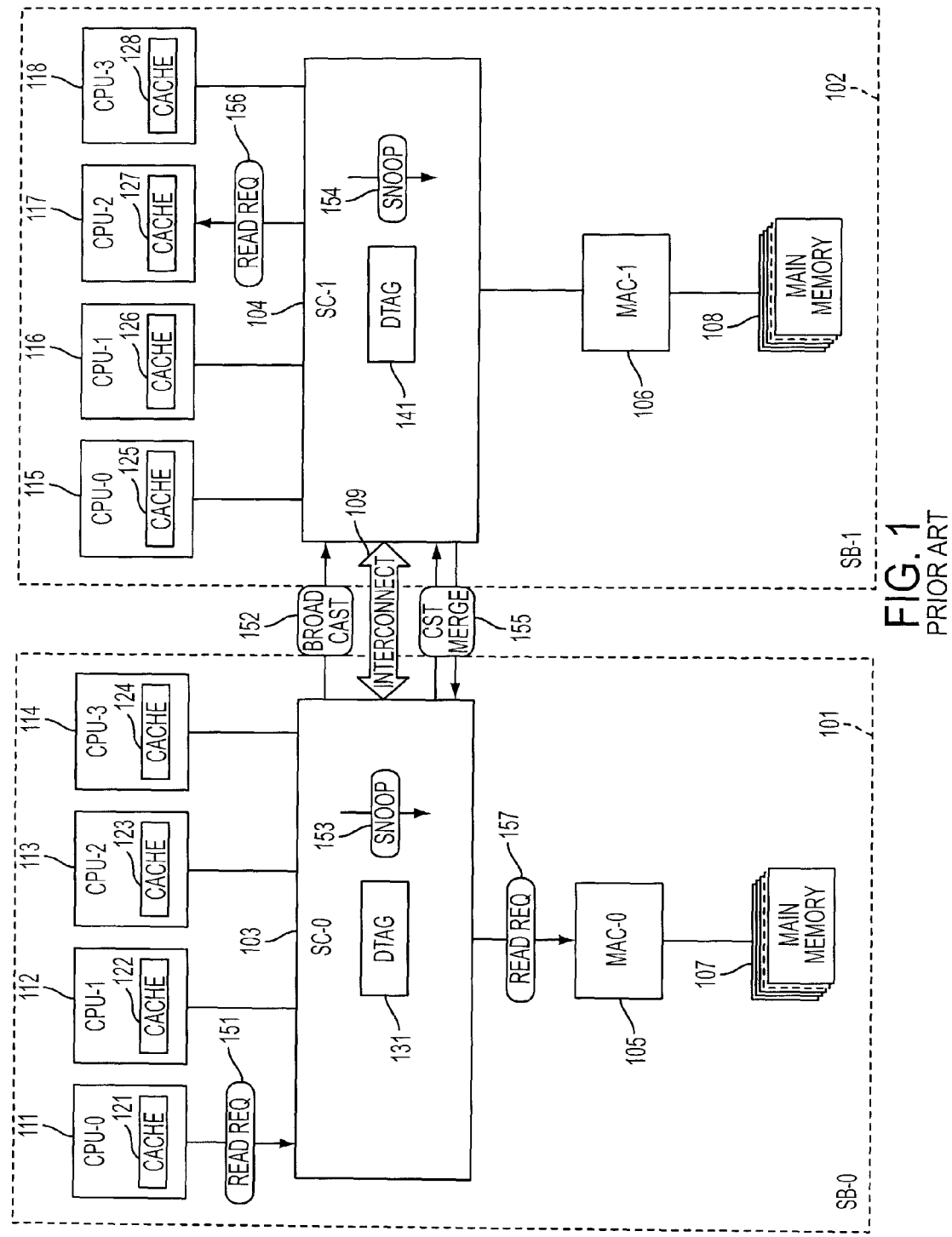
FIG. 1 is a diagram illustrating an operation example of the structure in the related art.

FIG. 1 illustrates a background art operation example in which the CPU under the control of another node responds to a request from a CPU under the control of a local node. The system controller LSI (SC) in each node is formed of a system board (SB) including a DTAG.

A system board (SB) 101 is includes a system controller LSI (SC) 103, CPU 111 to CPU114, a memory controller LSI (MAC) 105, and a main memory 107 to form a node of one unit.

In the same manner, a system board (SB) 102 includes a system controller LSI (SC) 104, CPU 115 to CPU 118, a memory controller LSI (MAC-) 106, and a main memory 108 to form a node of one unit.

The CPU111 to CPU114 connected directly to the system controller LSI 103 (SC) respectively includes cache memories 121 to 124 The DTAG 131 comprised in the SC103 performs management of data registered in the cache memories 121 to 124. In addition, the memory access controller LSI105 connected to the SC103 executes access to the main memory 107 connected directly to the MAC 105. The SC104 also has a structure similar to the SC103. The controllers are mutually connected via the interconnect 109. The cache memories 121 to 128 are the lowest layer (cache memories nearest to the interface of the system controller LSI (SC)) in each CPU and are not always limited to the secondary cache memories.

First, when a memory access request is generated in the CPU111 and a cache miss for data to be transmitted in response to the relevant memory access request is generated within the cache memory 121, the CPU 111 issues a read request 151 to the SC103. The SC103 having received the read request 151 issues a broadcast 152 to the SC104 via the interconnect 109. The SC 103 also executes a global snoop to the DTAG 131 by issuing a snoop 153 thereto. Moreover, the SC104 having received the broadcast 152 also issues a snoop 154 to the DTAG 141.

Next, the SC103 and SC104 respectively execute a cache status merge 155 by concentrating the search result of the DTAG through transmission and reception thereof via the interconnect 109. Here, when it is determined from the result of the cache status merge 155 that the object data of the read request 151 exists in the main memory 107, the SC103 issues a read request 157 to the memory access controller 105 under the control of the local node.

Alternatively, it maybe determined from the result of the cache status merge 155 that the object data of the read request 151 exists in the cache memory 127. The SC 104 issues a read request 156 to the CPU 117 in such a situation.

Figure 2:
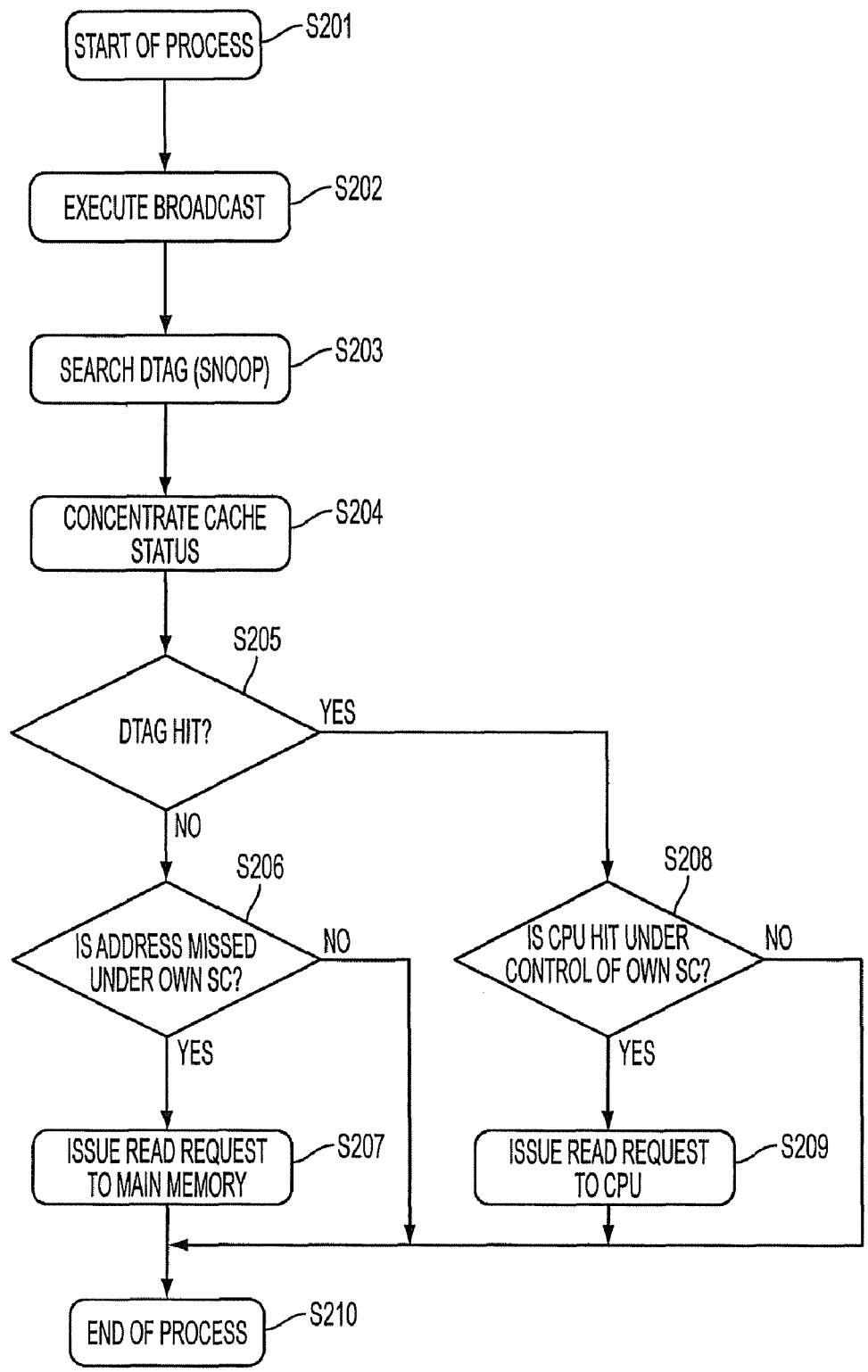
FIG. 2 is a flowchart indicating an operation example of the system controller LSI (SC) of the structure of the related art in FIG. 1.

FIG. 2 is a flowchart illustrating an operation example of the system controller LSI (SC) in FIG. 1. The process sequence of FIG. 2 will now be explained.

First in step 201, a system controller LSI (SC) starts the read request process, upon reception of a read request from a CPU. Next in step 202, the system controller LSI (SC), having received the read request, makes a broadcast to the system controllers LSIs (SCs) of not only the local node but also other nodes via an interconnect in order to search for the object data as the object of the read request. Moreover, in step 203, the system controller LSI (SC) which has conducted the broadcast, executes a global snoop by searching a DTAG within a local node by executing the snoop to the DTAG in the local node. In addition in step 204, the system controller LSI (SC) of each node executes the cache status merge by concentrating the search result of the DTAG through transmission and reception thereof via the interconnect.

Here in step 205, the system controller LSI (SC) having executed the cache status merge determines whether the DTAG has been hit or not in the search result of the DTAG. In step 208, when the DTAG is hit in the search result of the DTAG, it is determined whether the CPU having the data in which the DTAG is hit is the CPU under the control of the local node. When the CPU having the data which produces a hit in the DTAG is in the control of the local node, the read request of the object data is issued to the relevant CPU in step S209. The process is completed after reception of the object data step S210. Otherwise, when the CPU having the data producing a hit in the DTAG is not in the control of the local node, the process is completed in step 210.

Moreover, when a DTAG is miss in the search result of the DTAG, it is determined whether an address in which a DTAG miss is detected is within the address range of the main memory of the local node in step 106. When the address generating the DTAG miss is within the address range of the main memory of the local node, the read request of the object data is issued to the relevant main memory in step 207 and the process is completed after reception of the object data in step 210. Alternatively, when the address generating the DTAG miss is not in the address range of the main memory of the local node, the process is completed in step 120.

The memory control apparatus and memory control method for the system controller LSI (SC) or the like controls common possession of data between main memory and cache memory in the CPU. In the high performance computer system such as the large-scale SMP structure or the like, the data tag is used for management of data registered to the cache memory in the CPU of the local node. As is explained above, each responding process to the memory access request from the CPU is executed via the interconnect. Namely, the responding process to the memory access request from the CPU, is the global snoop for searching the DTAG of the local node and the DTAG of the other nodes. The cache status merge is executed for concentrating the search result of the DTAG and the data read process. When it has become apparent that the object data of the memory access request from the CPU exists in the CPU of the other nodes or in the main memory, the cache status merge is conducted via the interconnect.

Accordingly, all memory access requests among the nodes in the system are issued via the interconnect. If the throughput or bandwidth of the interconnect is insufficient for generation of memory access of the system as a whole, total performance of the system can be lowered. Moreover, propagation time on the interconnect gives adverse influence on the system performance because the latency is added to the memory access time has also been generated. Accordingly, it cannot be said for the system controller LSI (SC) of the background art that effective cache memory control has been conducted.

Japanese patent application number JP-A 110844/1994 discloses technology with which a common possession management unit is provided. The technology allegedly realizes consistency of cache by reducing traffic on a common bus. The technology utilizes a main storage tag memory for storing information indicating whether an address of local main memory exists on cache memory of another processor (common possession) or not (non-common possession). A cache status tag memory is also provided for storing the information indicating whether the data entry of cache memory is updated. and the data entry is then written back to the common memory (clean) or not (dirty) in a distributed common memory type multiprocessor system. For example the system can be formed by connecting a plurality of processors provided with CPU, cache memory, a part of the main memory, and a common possession control unit with the common bus. Consistency of cache is ensured by an invalidation instruction. The instruction is issued onto the common bus when the main memory tag is provided in common when the CPU writes data to the local main memory. Nothing is issued onto the common bus and the process is executed only within the local processor when the main memory tag is not common. Consistency is ensured through intervention into the access when the cache status tag is dirty for the access request from the other processor unit.

However, the above-referenced document discloses the technology that cache coherency control is executed using the cache status tag for ensuring consistency of cache memory within the node. Thus, the technology is different from the present invention.

Japanese patent application number 298653/2000 allegedly allows consistency of cache memory by holding, in the cache status tag, information indicating that a specific data block is exclusively held in a cache memory within a CPU. However, since this cache status tag implicates the cache tags of all CPUs, it is required to provide copies of the same contents to each node. Moreover, when the status of each cache memory has changed, the nodes must be notified.

Moreover, Japanese patent application number 298653/2000 discloses technology involving an access right memory and an access right control circuit provided within a node control circuit. to the technology allegedly improves the memory access throughput of the system by lowering frequency of the cache matching control for another processor node. The access right memory is checked first for the memory access from the local node. The cache matching control for the other node is omitted when the local node already has the access right. Moreover, the cache matching control request is issued only to the node where the CC bit is 1 when the local node does not have the access right. This occurs even when the relevant line is registered to the access right memory as a result of a check of the access right memory when the access is issued to the local node. For example, the CC bit can be provided, to each entry of the access right memory. The CC bit indicates that the relevant line is registered to the access right memory within the other node.

Japanese patent application number 298653/2000 discloses technology involving cache coherency control performed using the access right memory in order to allegedly allow consistency of the cache memory.

For example, the distributed common memory type multiprocessor system disclosed in Japanese patent application number 298653/2000 registers a plurality of access right entries. The system indicates that the access right to the blocks on the common memory exists in the local node. In this case, the access right status is required to include the three statuses of non-possession of the access right, possession of the common access right, and possession of the exclusive access right. Therefore, the RTAG in the present invention is different to a large extent from Japanese patent application number 298653/2000.

Accordingly, the technical scope disclosed in the above-identified patent applications can be said to be within the scope of the background art in regard to the control method of the response data to the memory access from the CPU. The technology of the applications does not disclose an effective cache memory control method.

Problems to be Solved by the Invention

In the memory control apparatus such as a system controller LSI (SC) or the like, in the background art, a chip set such as a server and a PC or the like are formed to perform control of common possession of data between the main memory and cache memory within a CPU. This can be accomplished using a data tag provided for management of data registered to the cache memory within the CPU of a local node, a global snoop for searching the DTAG of the local node and the DTAG of another node, cache status merge to be executed for concentrating the search result of the DTAG. Moreover, a data read process can be executed when it is proven that object data of a memory access request from the CPU exists in the CPU of the other node or in the main memory. the data read process executed via the interconnect as the responding process to the memory access request from the relevant CPU when a cache miss is generated in the cache memory within the CPU.

Moreover, the broadcast and cache status merge among the accesses via the interconnect are processed simultaneously on one interconnect. In comparison with the wire within the LSI, since the interconnect is physically restricted in the wire on the back plane board and connections between housings, the access via the interconnect has a bottleneck of the performance in the transfer bandwidth and latency. Accordingly, as the system becomes larger in scale, frequency of memory access increases, and multiple connection is required as much. As a result, such bottleneck of performance tends to be experienced.

Therefore, since the memory access request among the nodes in the system is surely issued via the interconnect, if the throughput or bandwidth of the interconnect is insufficient for generation of memory access in the system as a whole, a problem rises. Total performance of the system can be lowered. In addition, there lies a problem that the propagation time on the interconnect gives an adverse effect on the system performance because latency is added to the memory access time. Accordingly, it cannot be said for the memory control apparatus such as the system controller LSI or the like in the background art that effective cache memory control has been conducted.

DETAILED DESCRIPTION OF THE PREFERRED EMBODIMENTS

The present mentioned includes a memory control apparatus and memory control method for reducing traffic of the interconnect occurring in the timing of cache miss generated within the CPU. Reduction occurs by providing a retention tag (RTAG) for holding the separate data information indicating that object data is not held in the cache memory of any CPU in addition to the DTAG used for management of data registered in the cache memory within the CPU of the local node.

In contrast, the RTAG in the present invention is different to a large extent from Japanese patent application number 298653/2000. For example, the RTAG holds separate data information indicating that a data block of the main memory of the local node is not held in the cache memory within the CPU. This RTAG has an exclusive relationship to the cache tag within the CPU and the cache tag of another node. Moreover, a change of the RTAG is not always required, even when the status of the cache tag within the CPU is changed.

This technology is different from the memory control apparatus and memory control method of the present invention for saving traffic of the interconnect occurring in the timing of a cache miss within the CPU by providing retention tags (RTAG).

The RTAG of the present invention holds the separate data information indicating that the data block of the main memory of the local node is not held in the cache memory within the CPU. In addition, the access right status is not required to include the three statuses of non-possession of the access right, possession of the common access right, and possession of the exclusive access right.

The present invention provides a memory control apparatus and a memory control method which can reduce unwanted accesses via the interconnect such as broadcast or the like and improve throughput in the memory access. Access to a retention tag (RTAG) storage as the exclusive tag for holding separate data information can be made. The RTAG indicates that the specific data block of main memory of the local node is not held in the secondary cache memory of any CPU. The RTAG can be accessed before execution of the broadcast for the DTAG of the local node and the DTAG of another node. A cache miss can be generated in the cache memory within the CPU for the data to be read in response to the memory access request from the CPU in the memory control apparatus such as the system controller LSI or the like. for example, the system controller LSI or the like can include a chip set such as server and PC or the like. The LSI can execute control of common possession of data between main memory and cache memory within the CPU by using a data tag used for management of data registered to the cache memory within the CPU of the local node.

Means for Solving the Problems

In order to attain the object explained above, the present invention discloses a memory control apparatus connected to at least one CPU including cache memories and main memories. The apparatus can execute a data response process for a read request from a certain CPU. The apparatus can include retention tags for holding separate data indicating that the specific data included in the main memories is not included in any cache memory.

Moreover, the present invention discloses a memory control apparatus connected to at least one CPU including a first cache memory and main memories to execute a data response process for a read request from a certain CPU. The apparatus can include a second cache memory for holding data included in the main memories, and retention tags for holding separate data indicating that the specific data included in the main memories is not included in any of the first cache memory and included in a second cache memory of the local node.

Moreover, the present invention is also directed to an information processing apparatus including a plurality of memory control apparatuses connected to at least one CPU including cache memories and main memories to execute a data response process for a read request from a certain CPU. The memory control apparatuses includes retention tags for holding separate data indicating that the specific data included in the main memories is not included in any cache memory and are coupled with each other via the transmission line.

Moreover, the present invention discloses an information processing apparatus including a plurality of memory control apparatuses connected to at least one CPU including a first cache memory and main memories to execute a data response process for a read request from a certain CPU. The main memory control apparatus includes a second cache memory for holding the data included in the main memories and retention tags for holding separate data indicating that the specific data included in the main memories is not included in any of the first cache memory and included in a second cache memory of the local node. The memory control apparatuses are coupled with each other via the transmission line.

Moreover, the present invention can include the memory control apparatus explained above, with characterized in that the second cache memory holding not only the data included in one main memory connected to the memory control apparatus but also the data included in the other main memories connected to the memory control apparatus via the transmission line.

Moreover, the present invention is directed to a memory control method of a memory control apparatus connected to at least one CPU including cache memory and main memories to execute a data response process for a read request from a certain CPU. A read request issued from a certain CPU is received, access is made to the retention tags for holding the separate data indicating that the specific data included in the main memory is not included in any cache memory, and a read request is issued to the main memory when the object data of the read request is included in the retention tags.

Moreover, the present invention discloses a memory control method of a memory control apparatus including a second cache memory connected to at least one CPU having a first cache memory and main memories to hold the data included in the main memories to execute the data response process for a read quest from a certain CPU. A read request issued from a certain CPU is received, access is made to the retention tags for holding the separate data information indicating that the specific data included in the main memories is not included in any of the first cache memory and second cache memory, and a read request is issued to the main memories when the object data of the read request is included in the retention tags.

Moreover, the present invention is directed to a memory control method of an information processing apparatus including a plurality of memory control apparatuses connected to at least one CPU including cache memories and main memories to execute a data response process for a read request from a certain CPU. A read request issued from a certain CPU is received, access is made to the retention tags for holding the separate data information indicating that the specific data included in the main memories is not included in any cache memory, and a read request is issued to the main memories when the object data of the read request is included in the retention tags.

Moreover, the present invention is directed to a memory control method of an information processing apparatus including a plurality of memory control apparatuses connected to at least one CPU. The CPU can include a first cache memory and main memories to have a second cache memory for holding the data included in the main memories and for executing the data response process for the read request from a certain CPU. A read request issued from the CPU is received, access is made to the retention tags for holding the separate data indicating that the specific data included in the main memories is not included in any of the first cache memory and second cache memory, and a read request is issued to the main memories when the object data of the read request is included in the retention tags.

Moreover, the present invention is directed to the memory control method explained above, characterized in that the second cache memory holds not only the data included in one main memory connected to the memory control apparatus but also the data included in another main memory connected to the memory control apparatus via a transmission line. When the object data of the read request is included in the retention tags and the object data is judged to be the data included in the non-local main memory in the access to the retention tags, a read request is also issued to relevant other main memory.

Figure 3:
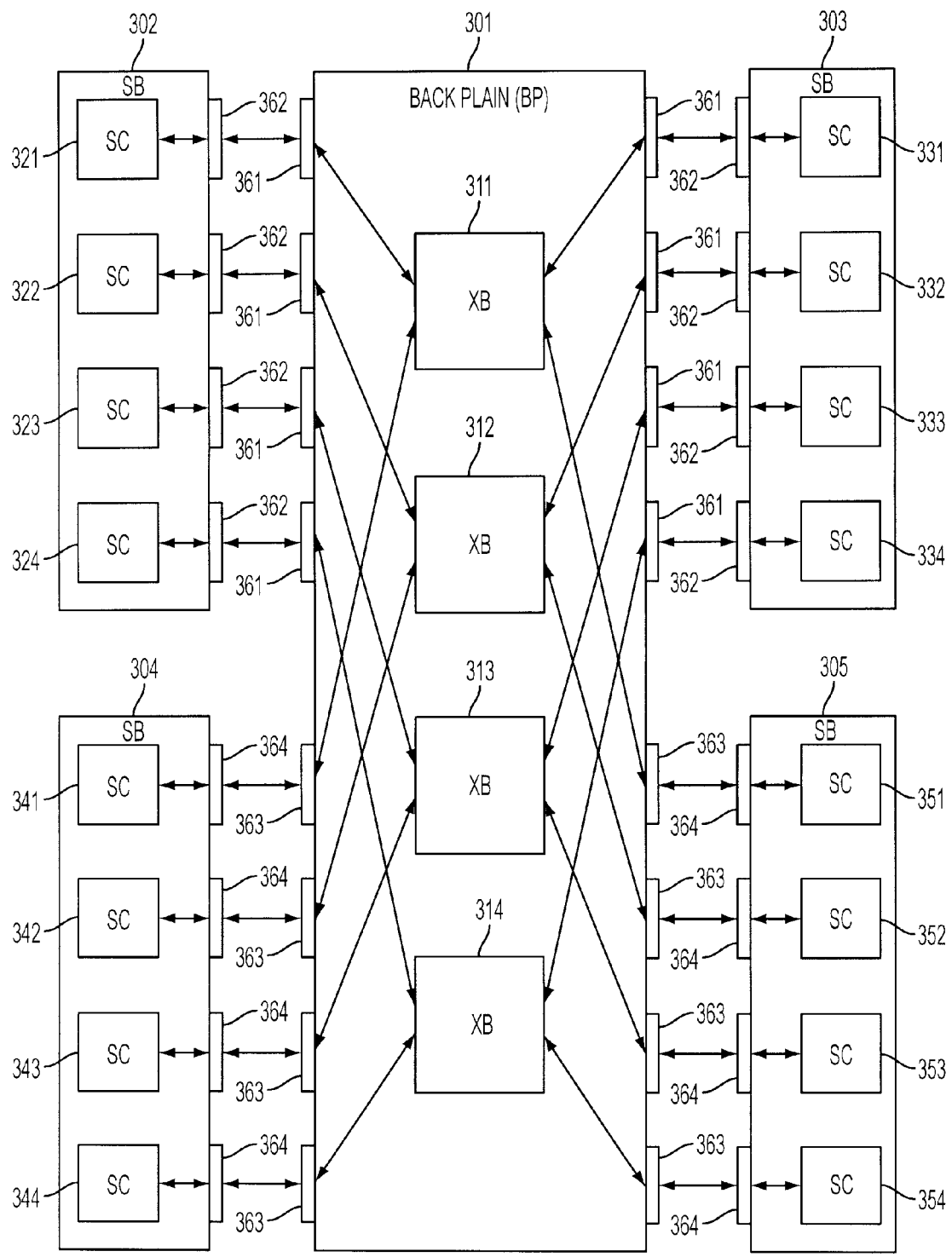
FIG. 3 is a diagram illustrating an example of the total hardware structure of a computer system in the present invention.

FIG. 3 illustrates an example of a total hardware structure of a computer system utilizing crossbar switch LSIs (XBs) and system controller LSIs (SCs), to which the present invention can be adapted.

A back plain (BP) 301 mounts a plurality of crossbar switch LSIs (XBs) 311 to 314. Connections of total systems are controlled by providing interfaces with the system boards (SBs) 302 to 305 via the connectors 361 to 364. The system boards (SBs) 302 to 305 mount a plurality of system controller LSIs (SCs) 321 to 324, 331 to 334, 341 to 344, 351 to 354, and a memory controller LSI (MAC) for controlling main memories and a plurality of CPUs (in the figure, the CPU and the LSI such as memory controller LSI (MAC) or the like are not illustrated). The system controller LSI (SC) is provided with interfaces for other system controller LSI's (SC's) and a plurality of CPUs and memory controller LSI's (MAC'S) mounted on the system board (SB). Accordingly, the system boards SBs 302 to 305 are defined as a unit of expansion of the processing capability in the relevant computer system.

Figure 4:
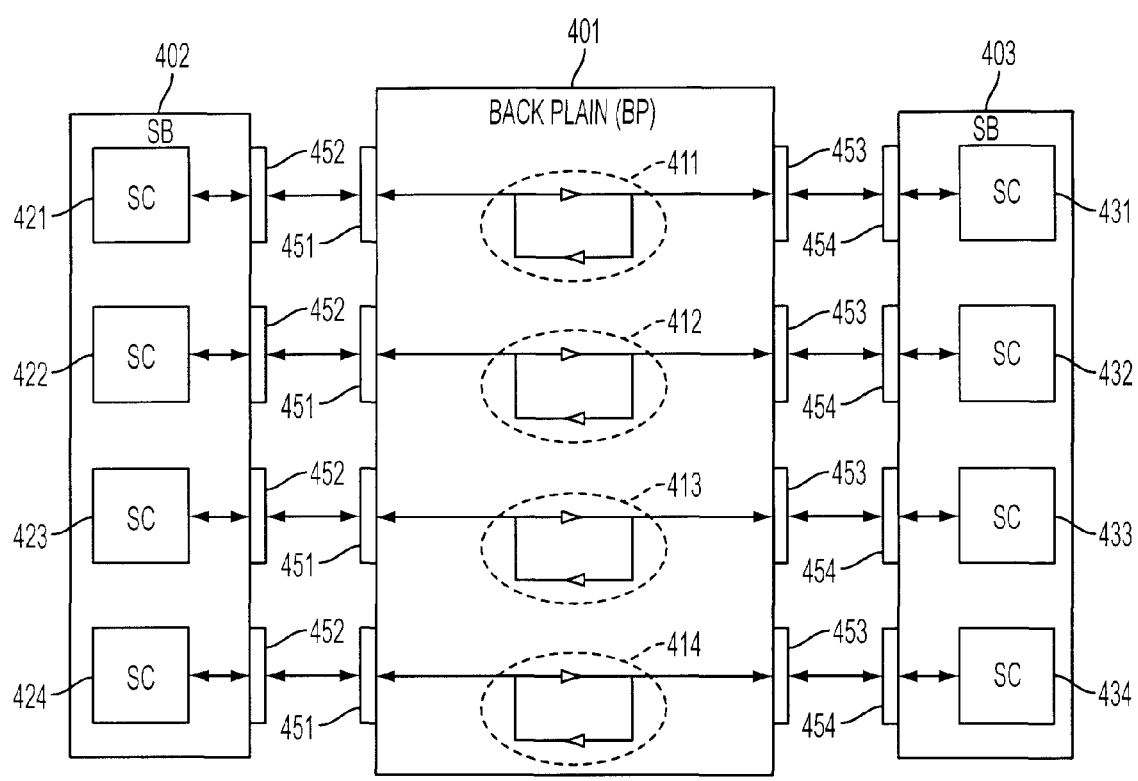
FIG. 4 is a diagram illustrating another example of the total hardware structure of the computer system of the present invention.

Moreover, FIG. 4 illustrates another example of the total hardware structure of the computer system utilizing system controller LSI's (SC's), to which the present invention is adapted.

The back plain (BP) 401 mounts a plurality of transceivers 411 to 414 and controls connections of the total system by providing interfaces with the system boards (SBs) 402, 403 via the connectors 451 to 454. The system boards (SBs) 402, 403 respectively mount a plurality of system controller LSI's (SC's) 421 to 424, 431 to 434, and a memory controller LSI (MAC) for controlling main memories and a plurality of CPU's (in the figure, the CPU and LSI such as a memory controller LSI (MAC) or the like are not illustrated). The system controller LSI (SC) is provided with interfaces for other system controller LSI's (SC's), and a plurality of CPUs and memory controller LSI's (MAC's) mounted on the system board (SB) (details will be further explained below). Accordingly, the system boards (SB's) 402, 403 are defined as a unit of expansion of the processing capability in the relevant computer system.

Figure 5:
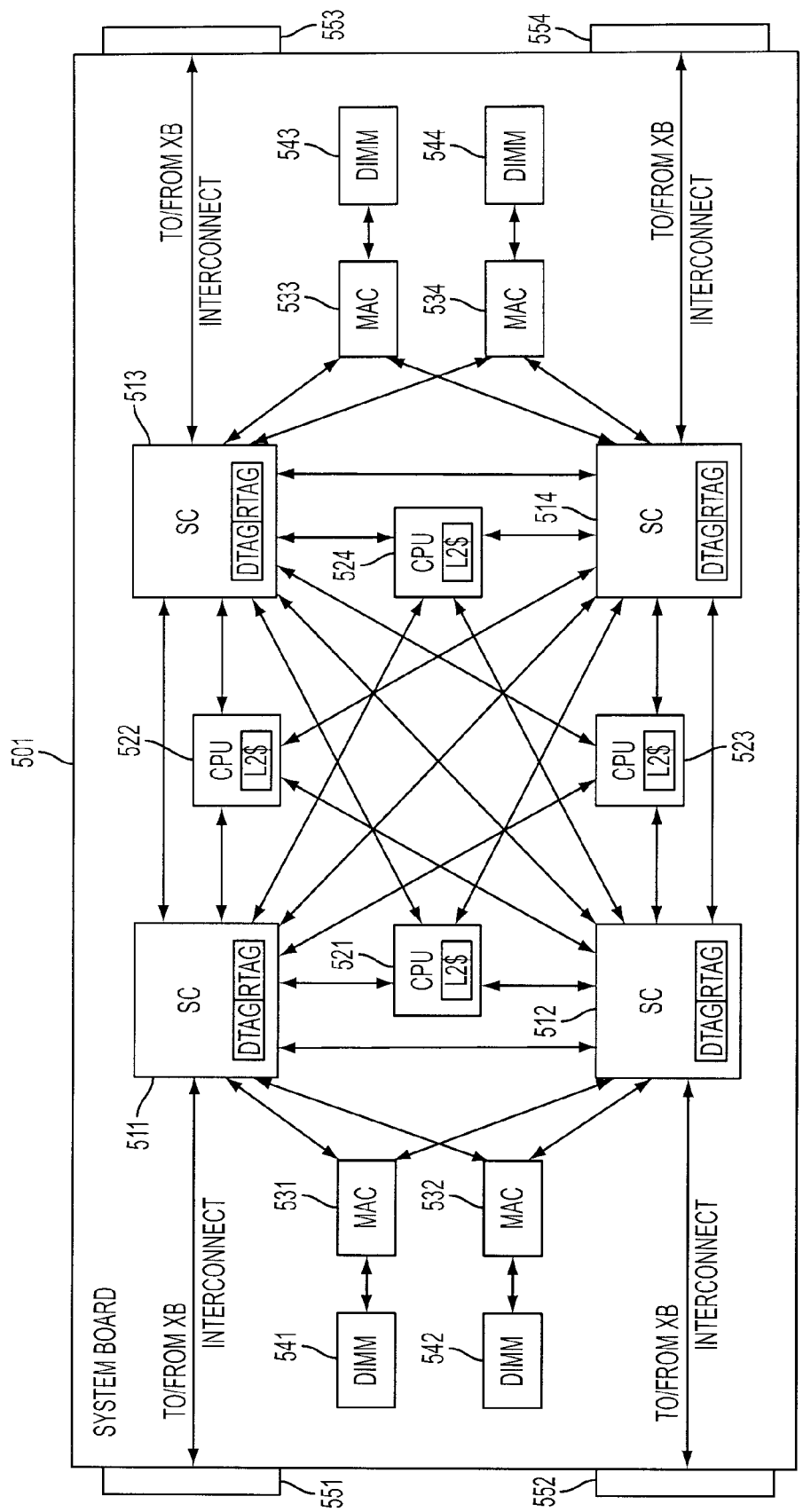
FIG. 5 is a diagram illustrating an example of the hardware structure of a system board (SB) of the present invention.

FIG. 5 illustrates an example of a hardware structure of a system board (SB) for mounting the system controller LSI (SC) of the present invention.

The system board (SB) 501 mounts a plurality of system controller LSIs (SC's) 511 to 514, a plurality of CPU's 521 to 524, a plurality of memory controller LSI's (MAC) 531 to 534, a plurality of memory modules (DIMM) 541 to 544, and a plurality of connectors 551 to 554.

Here, the system controller LSI (SC) 511 will be explained as an example. The system controller LSI (SC) 511 is connected with the other system controller LSI's (SC's) 512 to 514, a plurality of CPU's 521 to 524, and a plurality of memory controller LSI's (MAC's) 531, 532. Moreover, the system controller LSI (SC) 511 includes a data tag DTAG used for management of data registered to the secondary cache memories of the CPU's 521 to 524 directly connected. The cache memories are of the local node. A retention tag (RTAG) is the exclusive tag memory for holding separate data information indicating that the data is not held in the secondary cache memories of the CPUs 521 to 524 of the local node and the CPUs of the other node. Moreover, the system controller LSI (SC) 511 also has the interface with the crossbar switch LSI (XB) mounted to the back plain via the connector 551. Accordingly, the system controller LSI (SC) 511 transmits and receives the data between the CPUs and memory controller LSIs (MACs) connected to the system controller LSI (SC) by providing a plurality of interfaces.

The system controller LSI (SC) 511 is connected to the CPUs 521 to 524 with the CPU local bus type interface, to the memory controller LSI's (MAC's) 531, 532 with the memory bus type interface, and to the other system controller LSI (SC's) 512 to 514 with the interconnect type interface, respectively. Moreover, the system controller LSI (SC) 511 is also connected to the crossbar switch LSI (XB) with the interconnect type interface, and in general with the interface similar to that for the system controller LSI (SC).

Figure 6:
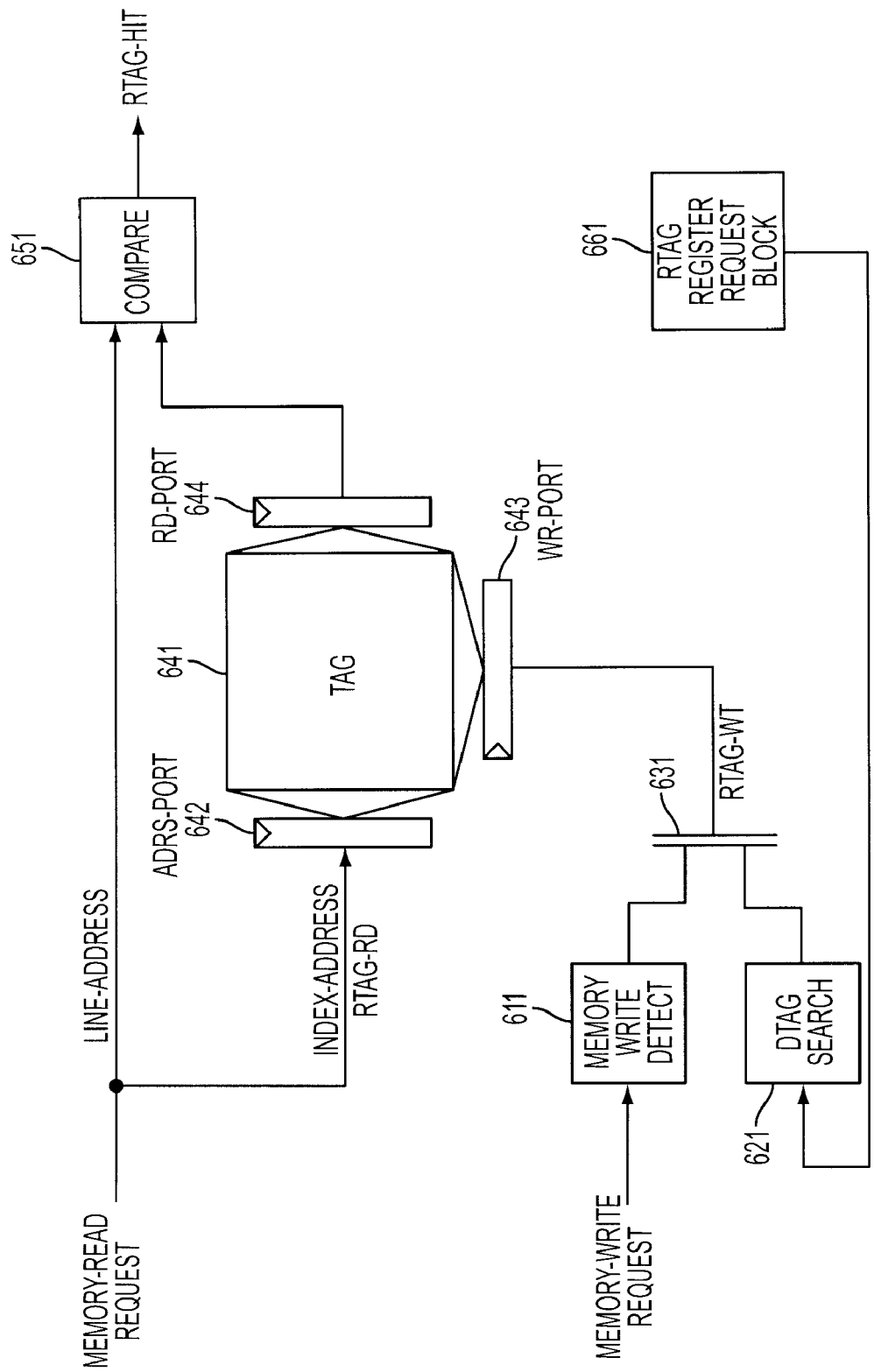
FIG. 6 is a schematic block diagram of a retention tage (RTAG) in the present invention.

FIG. 6 illustrates a schematic block diagram of the RTAG in the present invention. The RTAG in the system controller LSI (SC) includes a tag body (TAG) 641 for holding the separate data. The data indicates that the specific data block within the main memory of the local node is not held in any CPU cache. A write detector (MEMORY WRITE DETECT) 611 is for detecting the write (MEMORY-WRITE REQUEST) to the main memory of the local node due to replacement of the CPU cache and invalidation of the CPU cache and writing the relevant information (RTAG-WT) to the tag body (TAG) 641. A registration request issuing block (RTAG REGISTER REQUEST BLOCK) 661 is for issuing a registration request to the TAG. A DTAG searcher (DTAG SEARCH) 621 is for executing write (RTAG-WT) of the relevant information to the tag body (TAG) when it is proven as a result of a search of all TAGs in the system to the issued registration request that the object data of the memory access is not held in any CPU cache. A matching detector (COMPARE) 651 is for reading the tag address (RTAG-RD) designated by the more significant address (INDEX-ADDRESS) of the line address (LINE-ADDRESS) of the memory read request (MEMORY-READ REQUEST) and determining whether the data block is registered or not to the RTAG by comparing the relevant less significant address read out with the less significant address of the relevant memory request.

The RTAG writes (RTAG-WT), upon detection of write (MEMORY-WRITE REQUEST) to the main memory under the control of the local node in the write detector (MEMORY WRITE DETECT) 651, the information to the line indicated by the more significant address of the write address detected in the tag. The relevant line is divided into n ways and the way for the write is selected based on the LRU information in the same line. Even when it has become clear, as a result of the DTAG search for the RTAG registration request issued by the RTAG, that the RTAG is not registered to any CPU cache, the information is written (RTAG-VVT to the tag body (TAG) 641 with the similar sequence). Meanwhile, for the memory read request (MEMORY-READ REQUEST) from the CPU, the RTAG is searched before the broadcast of the relevant memory access request (MEMORY-READ REQUEST) via the interconnect. Here, when the request is hit in the RTAG, since it is apparent that the request is not registered to any CPU cache, it is not required to execute the broadcast. The read request is issued to the main memory of the local node. As a result, the access via the interconnect is reduced. Moreover, the latency is reduced when the broadcast is executed for each request. Thereby, the throughput can be improved.

Figure 7:
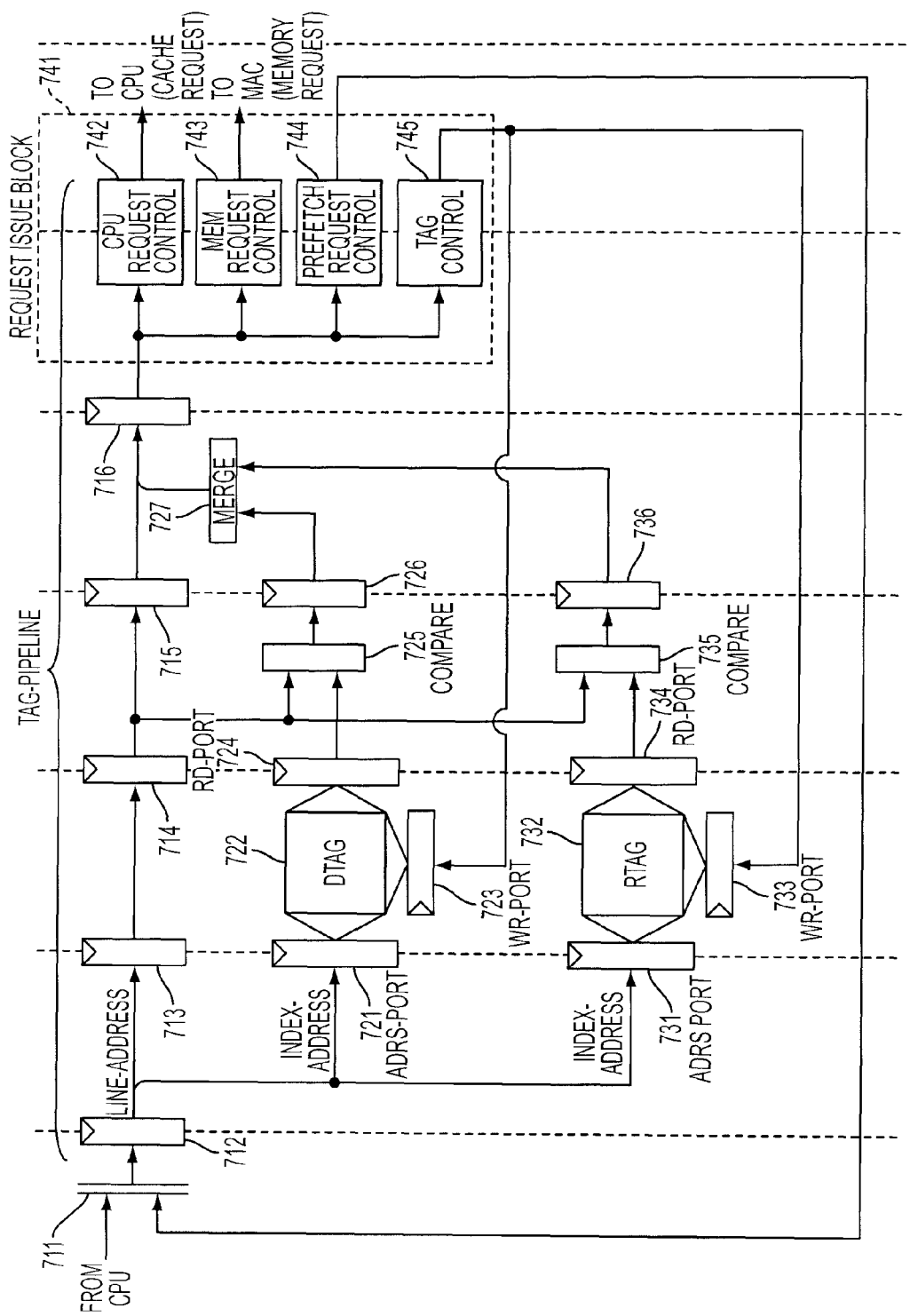
FIG. 7 is a diagram illustrating an example of the hardware structure of an RTAG controller in a system controller LSI (SC) in the present invention.

Next, FIG. 7 illustrates an example of a hardware structure of an RTAG controller within the system controller LSI (SC) in the present invention. The staging latches 712 to 716 form a tag access pipeline (TAG-PIPELINE).

First, operations of the tag access pipeline (TAG-PIPPE-LINE) will be explained. When the memory access request is issued from the CPU's 0 to 3 on the local system board (SB), an access command flows. After having passed a multiplexer 711, the staging latches 712 to 716 form a tag access pipeline (TAG-PIPELINE). An index address (INDEX-ADDRESS), which is the more significant address of the line address (LINE-ADDRESS) incorporated to the command is inputted respectively to the address ports 721 and 731 of the data tag (DTAG) 722 and retention tag (RTAG) 732. The index address is for indexing the DTAG 722 and RTAG 732. The less significant address as the result of an index of the tag memory is outputted to the output registers 724, 734 as the read ports. Moreover, the less significant address is compared with the less significant address flowing to the tag access pipeline (TAG-PIPELINE). Thereby, the matching inspection is performed to determine whether the data block as the object of the memory access request is registered or not to the DTAG and RTAG. Results of matching inspection are integrated, after having passed the staging latches 726 and 736, in a merge controller 727, then held in the staging latch 716, and are caused to flow into the tag access pipeline.

Here, the process to be executed in the system controller LSI (SC) is determined in accordance with the results of matching inspection. Namely, when the memory access request from the CPU is hit with the RTAG 732 in accordance with the results of matching inspection, a TAG update block (TAG CONTROL) 745 executes the invalidation of the relevant entry. A memory request issuing block (MEM REQUEST CONTROL) 743 issues a memory access request to the main memory. Moreover, if a miss is generated in the memory access request from the CPUs in both DTAG 722 and RTAG 732 in accordance with the results of matching inspection, a prefetch request issuing block (PREFETCH REQUEST CONTROL) 744 inputs the prefetch to the tag access pipeline (TAG-PIPELINE). When a miss is generated in both the DTAG 722 and RTAG 732 as the result of search, the TAG update block (TAG CONTROL) 745 registers the object address of the relevant prefetch request to the RTAG 732. Moreover, when a store request such as discharge of cache and block write or the like is generated, the TAG update block (TAG CONTROL) 745 registers the object address of the relevant store request to the RTAG 732. A CPU request issuing block (CPU REQUEST CONTROL) 742 issues the store request to the CPU as the access object.

Figure 8:
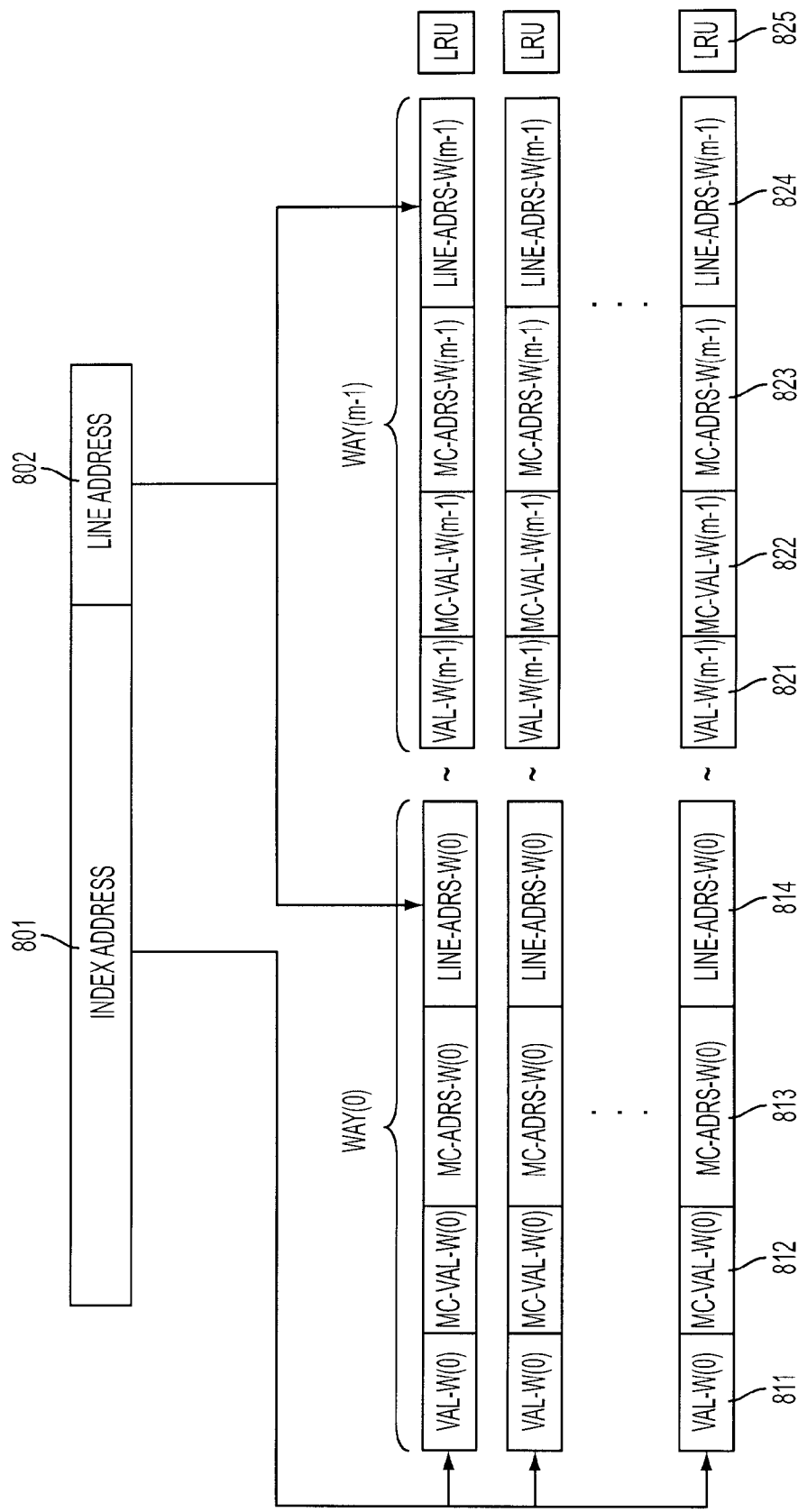
FIG. 8 is a diagram illustrating an example of a data format of the retention tag (RTAG) of m-way in the present invention.

FIG. 8 illustrates an example of data format of an m-way retention tag (RTAG) formed by division into an m-way in the present invention. The object address of a memory access request is formed of an index address (INDEX ADDRESS) 801 and a line address (LINE ADDRESS) 802. The index address is used for searching a tag as an index of tag memory. The line address is held in any of the line address entry (LINE-ADRS-W(0)) 814 in 0-way to the line address entry (LINE-ADRS-W(m−1)) 824 in (m−1) way in accordance with the way number as the LRU information to be held by the LRU (Least Recently Used) field.

Moreover, the memory cache address corresponding to each entry is held as the memory cache address (MC-ADRS-W(0)) 813 in 0-way to memory cache address 823 in (m−1)-way.

Moreover, a valid flag of each entry is held as the valid flag (VAL-W(0)) 811 in 0-way to the valid flag (VAL-W(m−1)) 821 in (m−1)-way. The valid flag for entry of each memory cache address is held as the valid flag (MC-VAL-W(0)) 812 in the memory cache address in 0-way to valid flag (MC-VAL-W(m−1)) 822 in the memory cache address in (m−1)-way.

Figure 9:
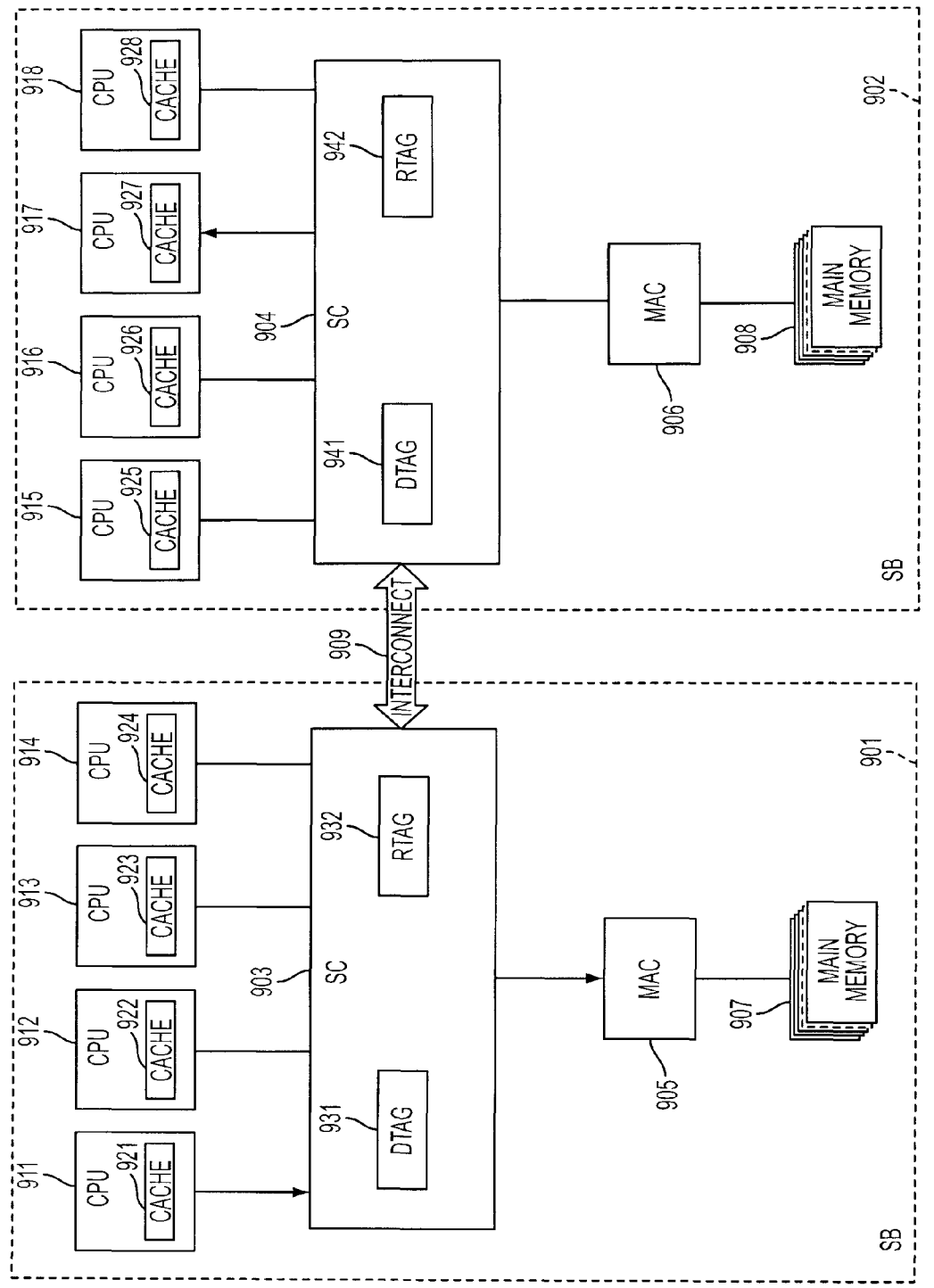
FIG. 9 is a diagram illustrating a basic structure of a system hardware forming a node of two units in the first embodiment of the present invention.

FIG. 9 illustrates a basic structure of a system hardware forming a node of two units in the first embodiment of the present invention.

The system board (SB) 901 includes a system controller LSI (SC) 903, CPU 911 to CPU 914, a memory controller LSI (MAC) 905, and a main memory (MAIN MEMORY) 907 in order to form a node or one unit.

In the same manner, the system board (SB) 902 includes a system controller LSI (SC) 904, CPU 915 to CPU 918, a memory controller LSI (MAC) 906, and a main memory (MAIN MEMORY) 908 to form a node of one unit.

The CPU 911 to CPU 914 connected in direct to the SC 903 respectively comprise cache memories 921 to 924. The DTAG 931 in the SC executes management of data registered to the cache memories 921 to 924. The RTAG 932 in the SC holds the separate data information indicating that the data block of the main memory 907 under the control of the local node is not held in any of the cache memories 921 to 924.

Moreover, the memory access controller LSI 905 connected to the SC 903 executes the access to the main memory 907 directly connected. The SC 904 also has a structure similar to the SC903. the SC 903 and SC 904 are connected with each other via the interconnect 909. The cache memories 921 to 928 are cache memories in the lowest layer comprised in each CPU (cache memory nearest to the interface of the system controller LSI (SC)) and are not always limited to the secondary cache memory.

Figure 10:
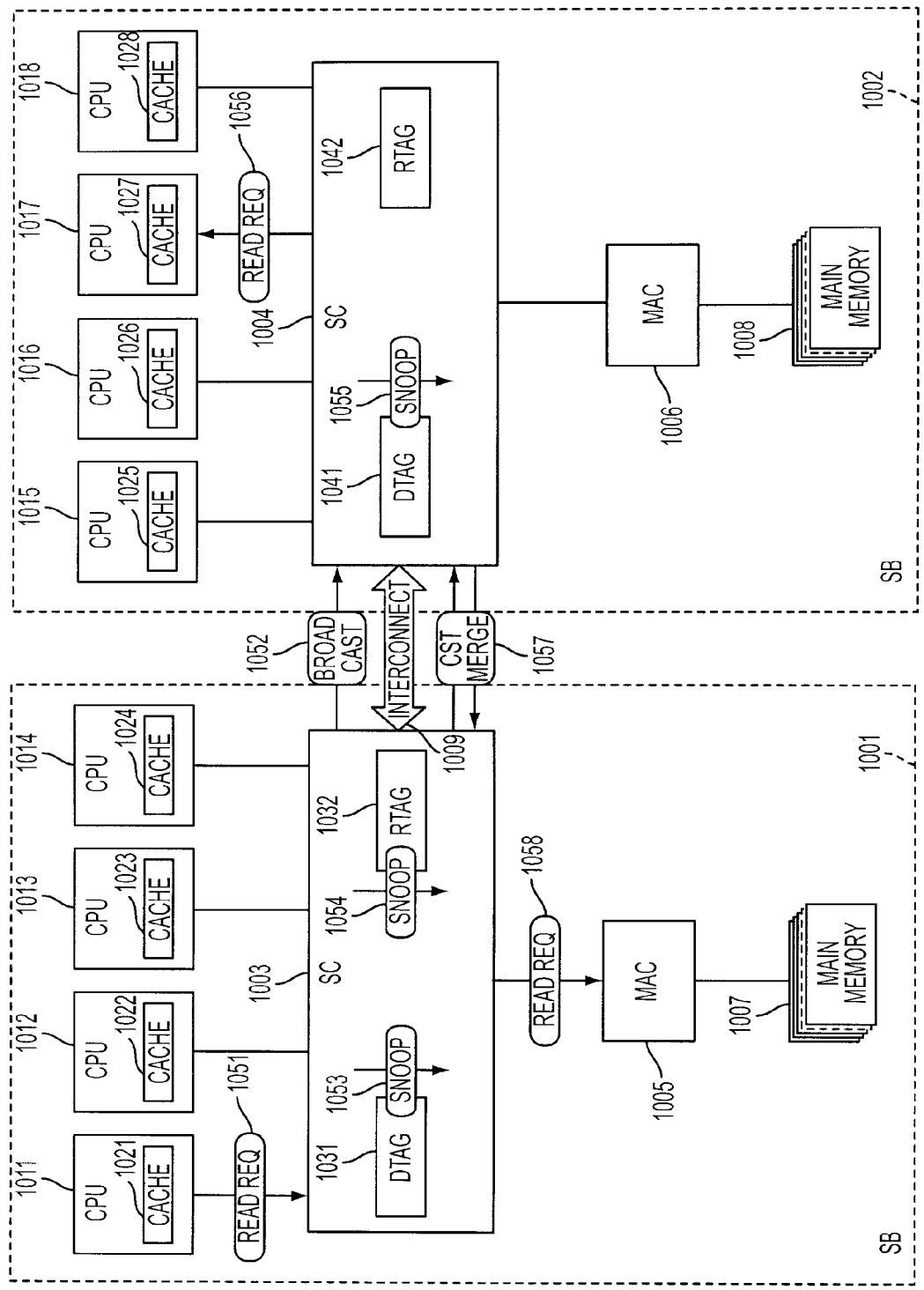
FIG. 10 is a diagram illustrating a first operation example when an RTAG is miss in the first embodiment of the present invention.

First Operation when an RTAG Miss Occurs in the First Embodiment of the Present Invention FIG. 10 illustrates an example of the first operation when an RTAG miss occurs in the first embodiment of the present invention in FIG. 9.

First, when a memory access request is generated in the CPU 1011 and a cache miss is generated in the data to be read in response to the relevant memory access request within the cache memory 1021, the CPU 1011 issues a read request 1051 to the SC 1003. The SC 1003 having received the read request 1051 executes first, before execution of the broadcast, the local snoop 1054 of the RTAG 1032. Here, only if a miss occurs in the local snoop 1054 of the RTAG 1032, the broadcast 1052 is issued to the SC 1004 via the interconnect 1009. The global snoop is executed by issuing a snoop 1053 also to the DTAG 1031. Moreover, the SC 1004 having received the broadcast 1052 also executes the global snoop by issuing a snoop 1055 also to the DTAG 1041.

Next, the SC 1003 and SC 1004 execute the cache status merge 1057 by concentrating the search results of the DTAG via the interconnect 1009 through transmission and reception thereof. Here, the result of cache status merge 1057 may reveal that the object data of the read request 1051 exists in the main memory 1007, which is directly connected to the memory access controller 1005. In such a situation the SC 1003 issues a read request 1058 to the memory access controller 1005 under control of the local node. Alternatively, the result of the cache status merge 1057 may reveal that the object data of the read request 1051 exists in the cache memory 1027 in the CPU 1017 under the control of the SC 1004, the SC 1004 issues a read request 1056 to the CPU 1017.

Figure 11:
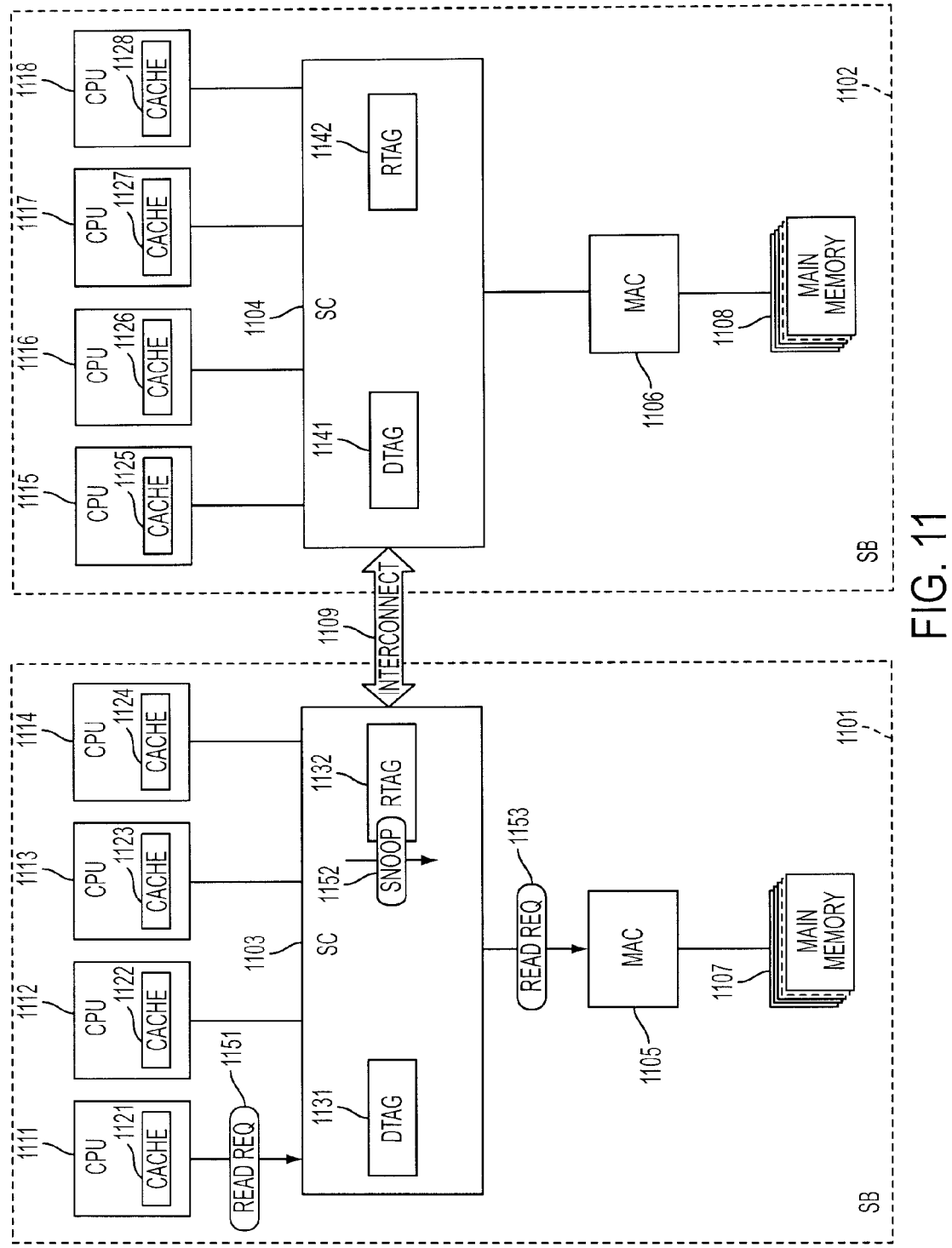
FIG. 11 is a diagram illustrating the first operation example when the RTAG is hit in the first embodiment of the present invention.

Example of First Operation when the RTAG is Hit in the First Embodiment of the Present Invention FIG. 11 illustrates an example of the first operation when the RTAG is hit in the first embodiment of the present invention in FIG. 9.

First, when a memory access request is generated in the CPU 1111 and a cache miss to the data to be read in response to the relevant memory access request is generated in the cache memory 1121, the CPU 1111 issues a read request 1151 to the SC 1103. The SC 1103 having received the read request 1151 executes the local snoop 1152 of the RTAG 1132 before execution of the broadcast. Here, the local snoop 1152 maybe hit with the RTAG 1132. Since it is apparent that the object data of the memory access request exists in the main memory 1107 under the control of the local node, local solution may be attained within the local node by issuing a read request 1153 to the MAC 1105 connected to the main memory 1107. Accordingly, since execution of the broadcast and cache status merge via the interconnect 1109 is no longer required, throughput and bandwidth of the interconnect are not consumed, giving no influence on the total performance of the system.

Figure 12:
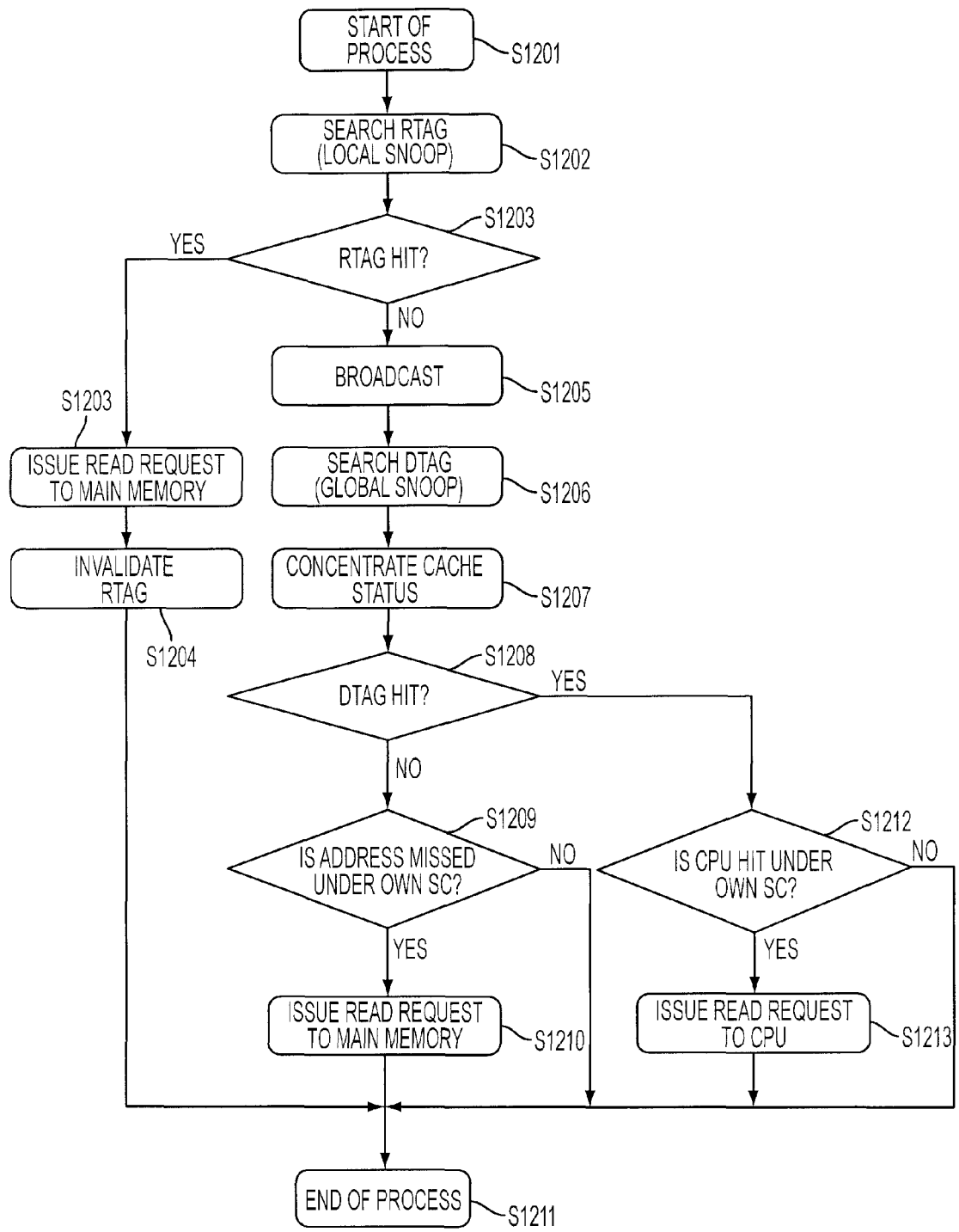
FIG. 12 is a flowchart indicating first operation example of the system controller LSI in the first embodiment of the present invention in FIG. 10 or FIG. 11.

Explanation of Flowchart Illustrating Example of First Operation in the First Embodiment of the Present Invention FIG. 12 is a flowchart illustrating an example of the first operation of the system controller LSI (SC) of the present invention in FIG. 10 or FIG. 11.

First, in step 1201, upon reception of the read request from the CPU, the system controller LSI (SC) starts the processes for the relevant read request. Next in step 1202 the system controller LSI (SC), having received the read request, executes first the local snoop of the RTAG before execution of the broadcast.

Here, when the RTAG is hit as a result of the local snoop, it is apparent that the object data of memory access request exists in the main memory of the local node. Thus, in step 1203, local solution can be attained within the local node by issuing a read request to the main memory. In addition, in step 1211, the process is completed after invalidation (step S1204) of the tag index in relation to the relevant read request of the RTAG.

Next, when an miss occurs in the RTAG as a result of the local snoop, it is not apparent that the object data of the memory access request exists in the main memory under the control of the local node. The system controller LSI (SC), having received the read request, executes the broadcast via the interconnect to search the data as object data of the read request to the system controller LSI (SC), not only of the local node but also of a non-local node, in step 1205. Moreover, the system controller LSI (SC), having conducted the broadcast, executes a global snoop by searching the DTAG within the local node by executing the snoop to the DTAG in the local node, in step 1206. In addition, in step 1207, the system controller LSI (SC) of each node respectively executes the cache status merge by concentrating the search results of the DTAG through transmission and reception via the interconnect.

Here, in step 1208 the system controller LSI (SC), having executed the cache status merge, determines whether the DTAG is hit or not in the search result of the DTAG. In step 1212, when the DTAG is hit in the search result of the DTAG, the system controller LSI (SC) also determines whether the CPU having the data hit in the DTAG is the CPU or not of the local node. In step 1213, when the CPU having the data hit in the DTAG is the CPU of the local node, the read request of the object data is issued to the relevant CPU. In step 1211, the process is completed after reception of the object data. Otherwise, when the CPU having the data hit in the DTAG is not under the control of the local node, the process is completed.

Figure 13:
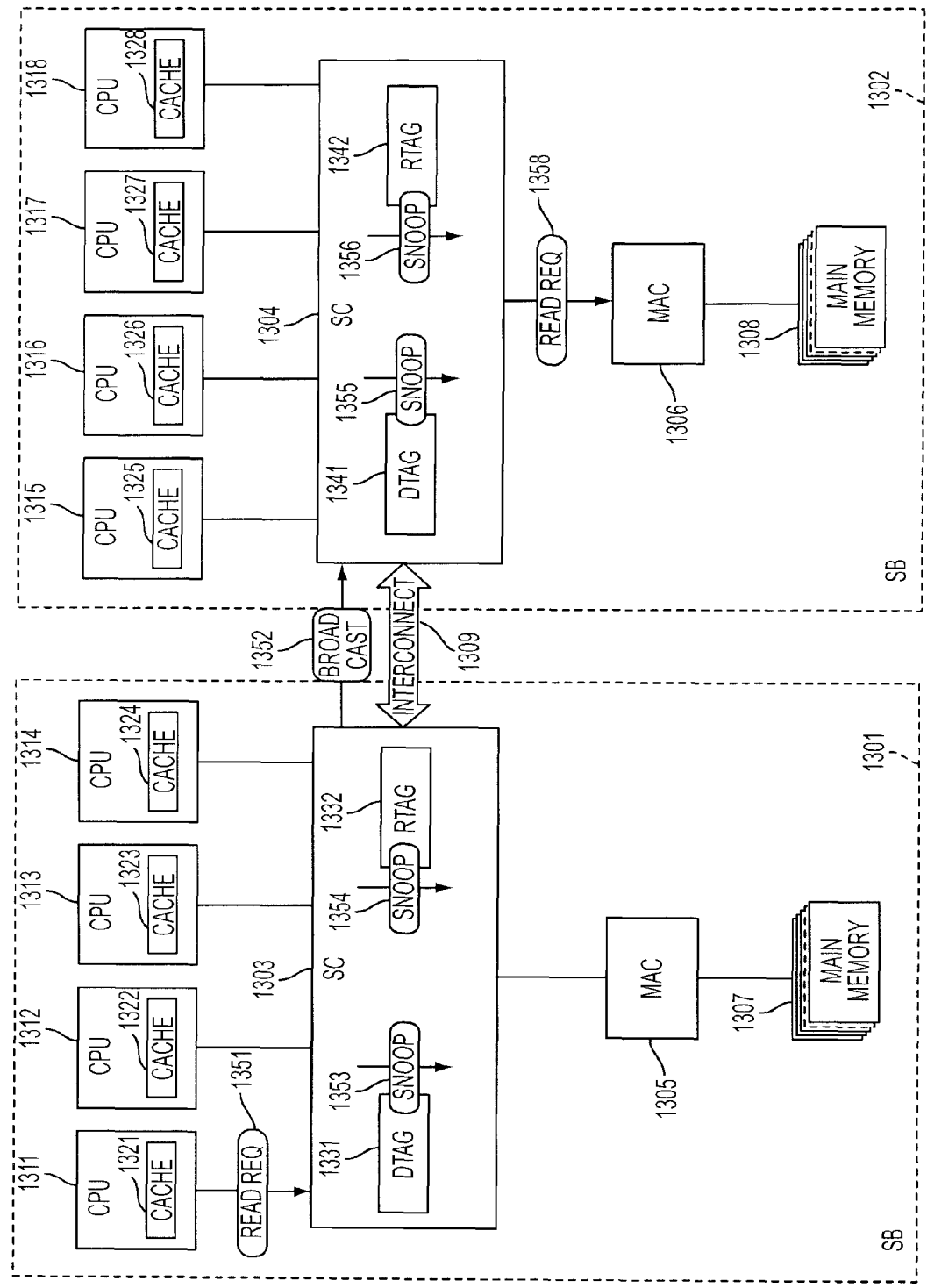
FIG. 13 is a diagram illustrating a second operation example when the RTAG under the control of the other node is hit in the first embodiment of the present invention.

Moreover in step 1209, when an miss of the DTAG is generated in the search result of the DTAG, it is moreover determined whether the address in which a DTAG miss occurs is within or not within the scope of address of the main memory of the local node. In step 1210, when the address including a DTAG miss is within the scope of address of the main memory under the control of the local node, the read request of the object data is issued to the relevant main memory. In step 1211, the process is completed after reception of the object data. Otherwise, in step 1211, when the address including a DTAG miss is not within the scope of address of the main memory of the local node, the process is completed Example of Second Operation when Hitting to DTAG Under the Control of the Local Node in the First Embodiment of the Present Invention FIG. 13 illustrates an example of the second operation when hitting to the DTAG of the local node in the first embodiment of the present invention in FIG. 9.

First, when a memory access request is issued in the CPU 1311 and a cache miss for the data to be read in response to the relevant memory access request is generated in the cache memory 1321, the CPU 1311 issues a read request 1351 to the SC 1303. The SC 1303 having received the read request 1351 issues the broadcast 1352 to the SC 1304 via the interconnect 1309 and also issues the snoops 1353 and 1354 to the DTAG 1331 and RTAG 1332 in order to execute the global snoop. Moreover, the SC 1304 having received the broadcast 1352 also executes the global snoop by issuing the snoops 1355 and 1356 to the comprised DTAG 1341 and RTAG 1342.

Here, when the snoop 1356 hits the RTAG 1342, since the object data of memory access request exists apparently in the main memory 1308 of the node of the SC 1304, a read request 1358 is issued to the MAC 1306 connected to the main memory 1308. Accordingly, since it is no longer required to execute the cache status merge, the time required for execution of the cache status merge can be shortened, and thereby throughput of the system can be improved.

Figure 14:
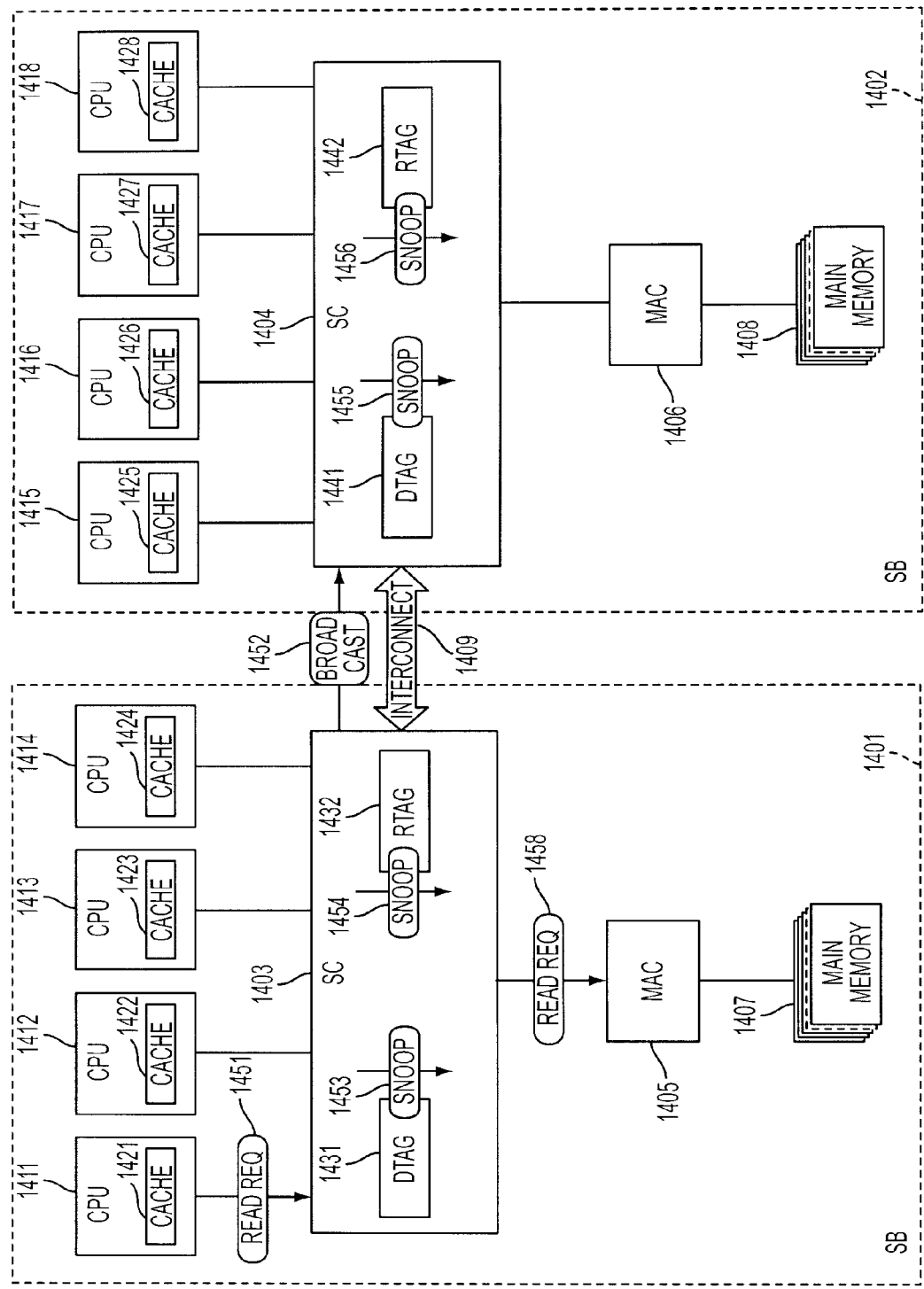
FIG. 14 is a diagram illustrating the second operation example when the RTAG under the control of the own node is hit in the first embodiment of the present invention.

Example of Second Operation when Hitting to RTAG Under the Control of the Own Node in the First Embodiment of the Present Invention FIG. 14 illustrates an example of the second operation when hitting to the RTAG of the local node in the first embodiment of the present invention in FIG. 9.

First, when a memory access'request is generated in the CPU 1411 and a cache miss in the data to be read in response to the relevant memory access request is generated in the cache memory 1421, the CPU 1411 issues the read request 1451 to the SC 1403. The SC 1403 having received the read request 1451 issues the broadcast 1452 to the SC 1451 via the interconnet 1409. The SC 1403 also executes the global snoop by issuing the snoops 1453 and 1454 to the DTAG 1431 and RTAG 1432. Moreover, the SC 1404, having received the broadcast 1452, also executes the global snoop by issuing the snoops 1455 and 1456 to the DTAG 1441 and RTAG 1442.

Here, it is apparent that the object data of the memory access request exists in the main memory 1407 of the local node when the snoop 1454 hits the RTAG 1432. Thus, the read request 1458 is issued to the MAC 1405 connected to the main memory 1407. Accordingly, since it is no longer required to execute the cache status merge, the time required for execution of the cache status merge can be shortened, and thereby throughput of the system can also be improved.

Figure 15:
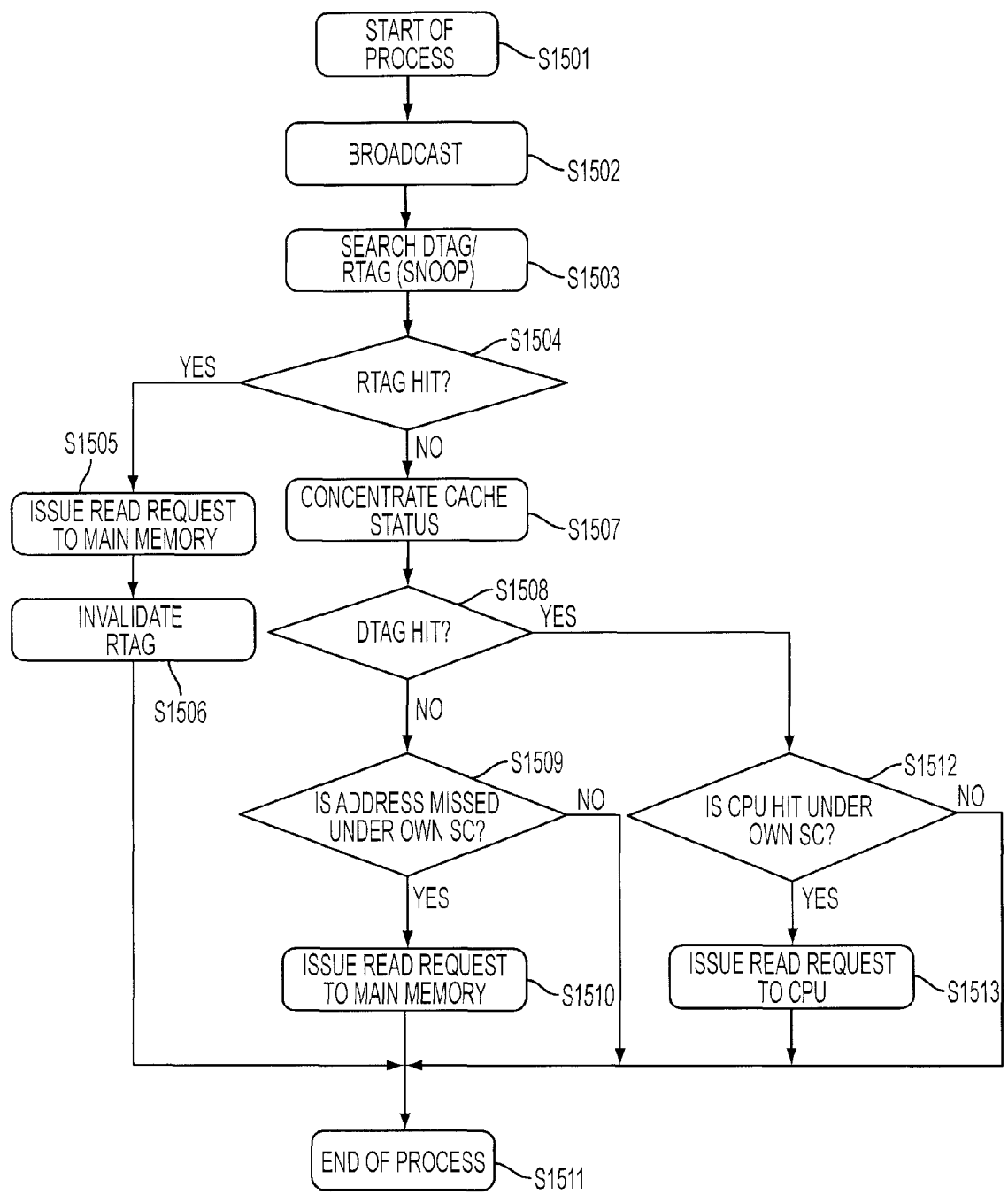
FIG. 15 is a flowchart indicating the second operation example of the system controller LSI (SC) of the first embodiment of the present invention in FIG. 13 or FIG. 14.

Explanation of Flowchart Indicating the Second Operation Example in the First Embodiment of the Present Invention FIG. 15 is a flowchart indicating the second operation example of the system controller LSI (SC) 1303 or 1403 in FIG. 14. Hereinafter, the processing sequence of FIG. 15 will then be explained.

First, in step 1501, upon reception of the read request from the CPU, the system controller LSI (SC) starts the process for the relevant read request. Next, in step 1502, the system controller LSI (SC), having received the read request, executes first the broadcast. With the result of the broadcast, in step 1503, the snoop of the DTAG and the RTAG is executed in all system controller LSIs (SCs).

Here, when the RTAG is hit under the control of the local node as a result of the snoop, it is apparent that the object data of the memory access request exists in the main memory of the relevant node. Thus, in step 1505, local solution can be attained within the local node by issuing the read request to the main memory of the relevant node. In addition, in step 1511, the process is completed after invalidation of the tag index for relevant read request of the RTAG in step 1506.

Next, when an RTAG miss occurs under the control of all nodes with a result of the snoop, the system controller LSI (SC) of each node executes the cache status merge in step 1507 by concentrating the search result of the DTAG through transmission and reception thereof via the interconnect in step 1507.

Here, in step 150, the system controller LSI (SC), having executed the cache status merge, determines whether the DTAG is hit or not in the search result of the DTAG. In step 1512, when the DTAG is hit in the search result of the DTAG, it is determined whether the CPU having the data hit to the DTAG is the CPU of the own node or not. When the CPU having the data hit to the DTAG is of the local node, in step 1513, the read request of the object data is issued to the relevant CPU. In step 1511, The process is completed after reception of the object data. Otherwise, in step 1511, when the CPU having the data hit to the DTAG is not under the control of the own node, the process is completed.

Moreover, in step 1509, when a DTAG miss is generated in the search result of the DTAG, it is determined whether the address generating a DTAG miss is within or not within the scope of address of the main memory under the management of the local node. When the address generating the DTAG miss is within the scope of the main memory of the local node, the read request of the object data is issued to the relevant main memory in step 1510 The process is completed after reception of the object data in step 1511. Otherwise, when the address generating a DTAG miss is not within the scope of address of the main memory under the control of the own node, the process is completed in step S1511.

Figure 16:
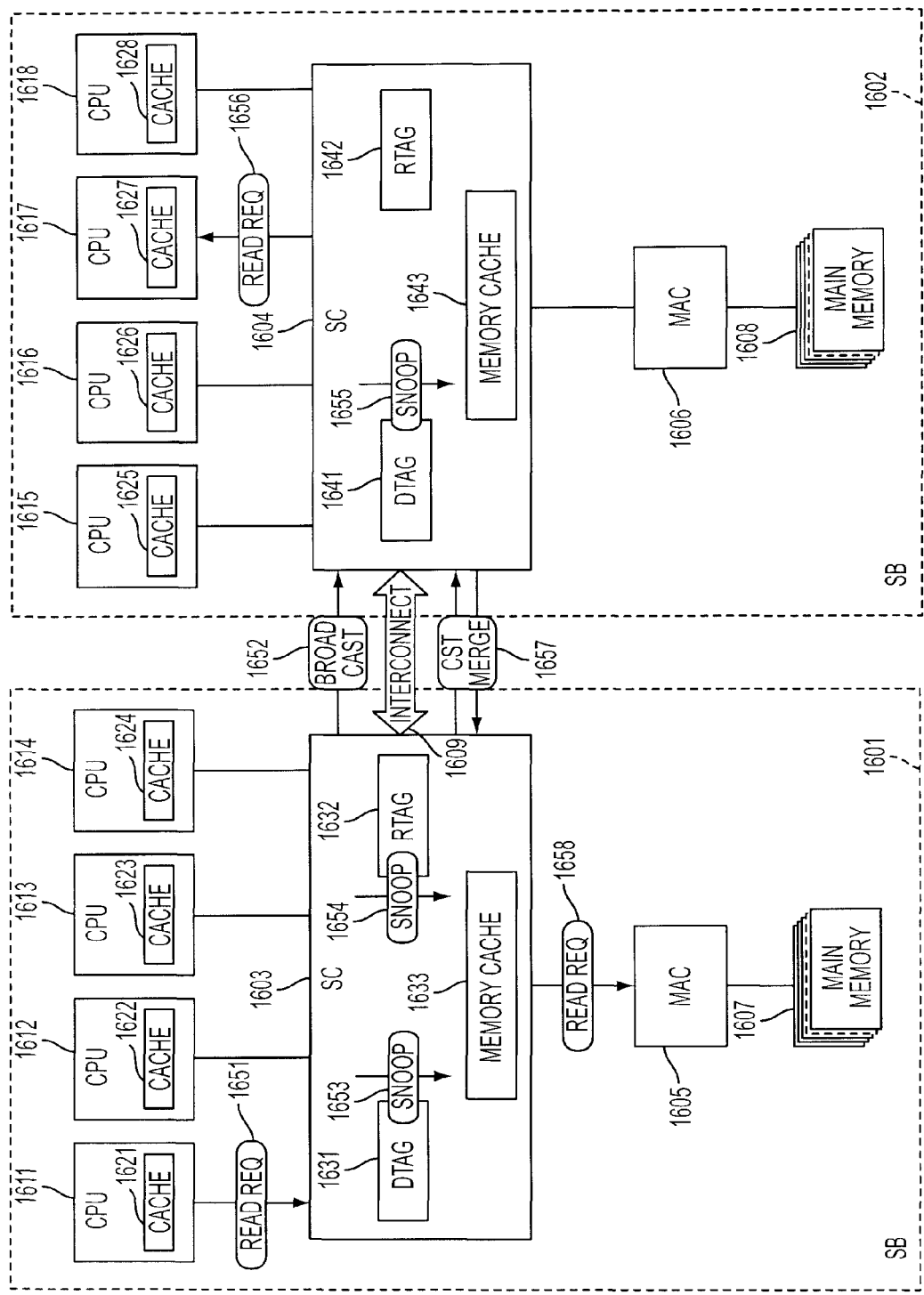
FIG. 16 is a diagram illustrating the first operation example when an RTAG is miss in the second embodiment of the present invention.

Operation Example when RTAG Miss is Generated in the Second Embodiment of the Present Invention FIG. 16 illustrates a first operation example when an RTAG miss is generated in the second embodiment of the present invention. FIG. 16 illustrates the basic structure of the system hardware to form a node of two units in the second embodiment of the present invention which is formed by adding a memory cache to the basic structure of the system hardware in the first embodiment of the present invention.

The memory caches 1633 and 1643 can further improve probability of local solution of the memory access request by holding not only the data blocks of the main memory of the local node but also the data blocks of the other nodes. The memory caches also enable quicker read operation of data than the main memory, thereby improving the latency of the memory access, and further improving the throughput. For example, improvement in the throughput can be realized through reduction in generation of a memory access request miss and latency in the memory request. For example, the memory cache 1633 can hold not only the data blocks in the main memory 1607 of the local node but also the data blocks in the main memory 1608 of another node. Memory cache 1634 holds not only the data blocks within the main memory 1608 of the local node but also the data blocks in the main memory 1607 of the other nodes.

First, when an memory access request is generated in the CPU 1611 and a cache miss in the data to be responded to the relevant memory access request is generated in the cache memory 1621, the CPU 1611 issues a read request 1651 to the SC 1603. The SC 1603 having received the read request 1651, executes first the local snoop 1654 of the RTAG 1632 before execution of the broadcast. Here, only when a miss is generated in the local snoop 1654 of the RTAG 1632, the global snoop can be executed by issuing the broadcast 1652 to the SC 1604 via the interconnect 1609 and then issuing the snoop 1653 also to the DTAG 1631. Moreover, the SC 1604, having received the broadcast 1652, also executes the global snoop by also issuing the snoop 1655 to the DTAG 1641.

Next, the SC 1603 and SC 1604 execute the cache status merge 1657 by concentrating the search results of the DTAG through transmission and reception thereof via the interconnect. Here, it can become apparent from the result of the cache status merge 1657 that the object data of the read request 1651 exists in the main memory 1607 connected directly to the memory access controller 1605. The SC 1603 issues the read request 1658 to the memory access controller 1605 of the local node. Otherwise, when it is revealed by the result of the cache status merge 1657 that the object data of the read request 1651 exists in the cache memory 1627 included in the CPU 1617 of the SC 1604, the SC 1604 issues the read request 1656 to the CPU 1617.

Figure 17:
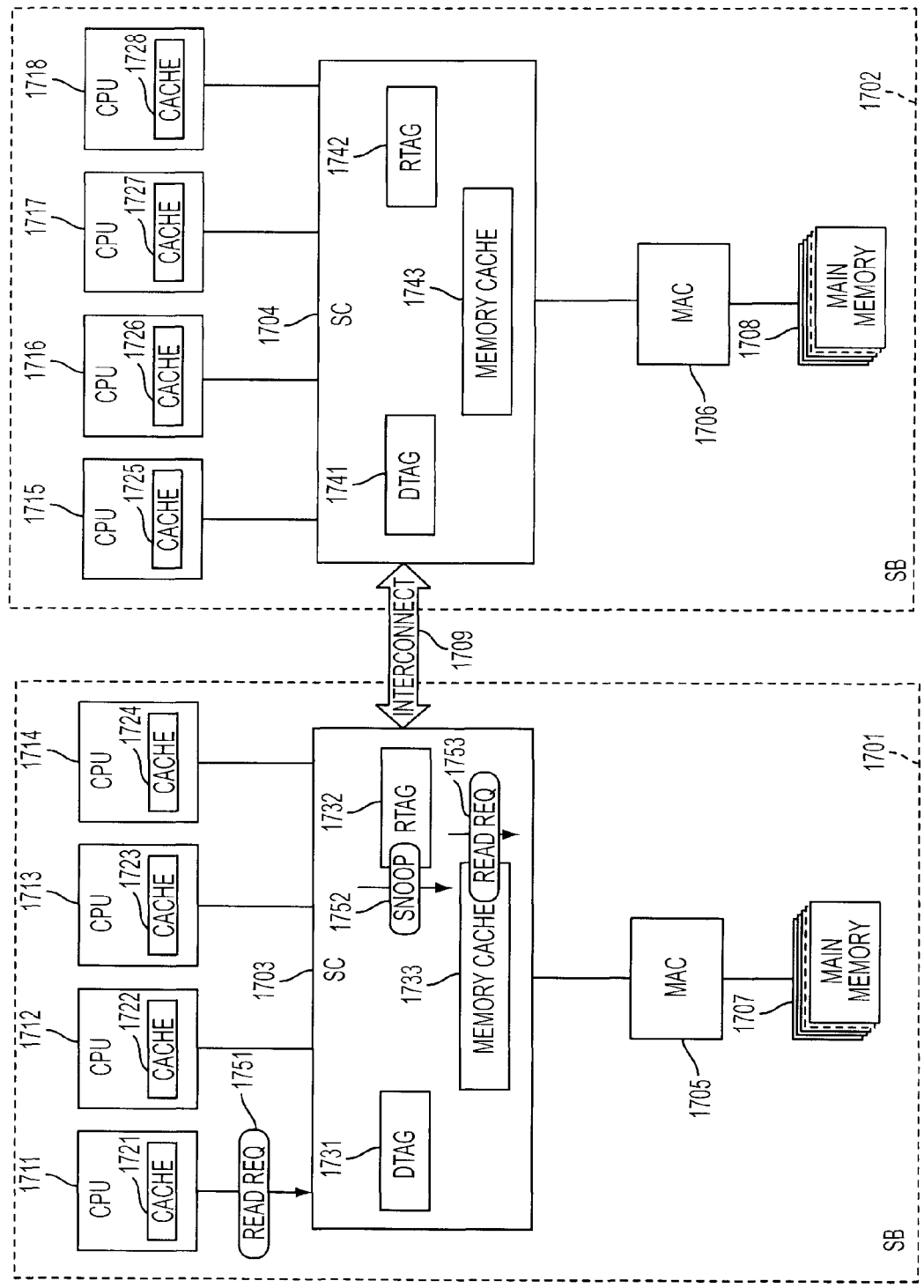
FIG. 17 is a diagram illustrating the first operation example when the RTAG is hit in the second embodiment of the present invention.

First Operation Example when the RTAG is Hit in the Second Embodiment of the Present Invention FIG. 17 illustrates a first operation example when the RTAG is hit in the second embodiment of the present invention.

First, when a memory access request is generated in the CPU 1711 and a cache miss is also generated for the data to be read in response to the relevant memory access request in the cache memory 1721, the CPU 1711 executes a read request 1751 to the SC 1703. The SC 1703, having received the read request, executes the local snoop 1752 of the RTAG 1732 before execution of the broadcast. Here, when the RTAG 1732 is hit under the assumption that the local snoop 1752 exists within the memory cache 1733, it is apparent that the object data of the memory access request exists within the memory cache 1733 of the local node. Thus, the local solution in the local node can be attained by issuing the read request 1753 to the memory cache 1733. Accordingly, since it is no longer required to execute the broadcast and cache status merge via the interconnect 1709, the throughput and bandwidth of the interconnect are not consumed and any influence is not applied to the performance of the total system.

Figure 18:
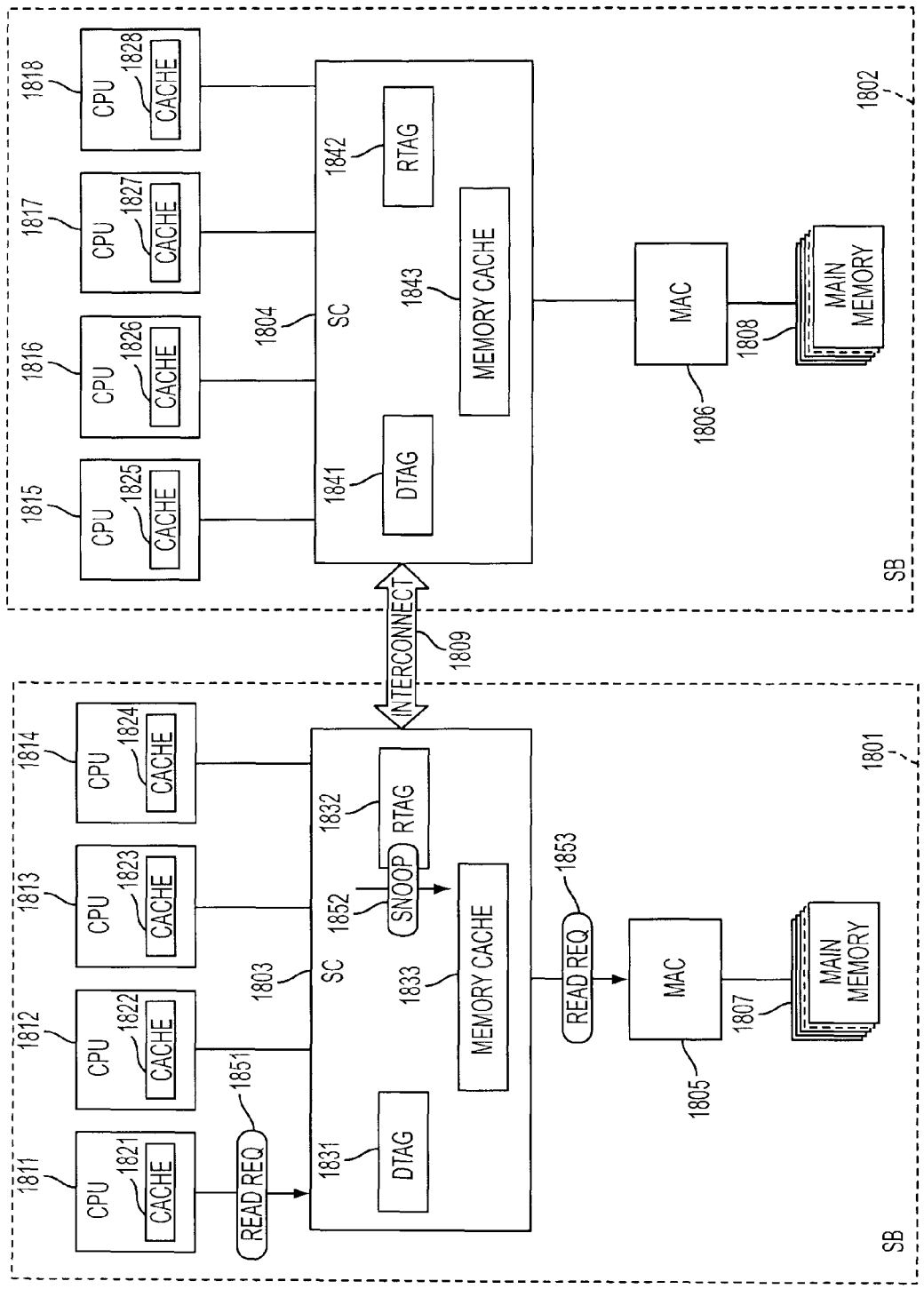
FIG. 18 is a diagram illustrating the second operation example when the RTAG is hit in the second embodiment of the present invention.

Second Operation Example when the RTAG is Hit in the Second Embodiment of the Present Invention FIG. 18 illustrates the second operation example when the RTAG is hit in the second embodiment of the present invention.

First, when a memory access request is generated in the CPU 1811 and a cache miss in the data to be responded to the relevant memory access request is generated in the cache memory 1821, the CPU 1811 issues a read request 1851 to the SC 1803. The SC 1803, having received the read request 1851, executes first the local snoop 1852 of the RTAG 1832 before execution of the broadcast. Here, when the RTAG 1832 is hit under the assumption that the local snoop 1852 exists in the main memory 1807, it is apparent that the object data of the memory access request exists within the main memory 1807 of the local node. Thus, the local solution can be attained within the local node by issuing the read request 1853 to the MAC 1805 connected to the main memory 1807. Accordingly, since it is no longer required to execute the broadcast and cache status merge via the interconnect 1809, throughput and bandwidth of interconnect are not consumed and any influence is not applied to the performance of the total system.

Figure 19:
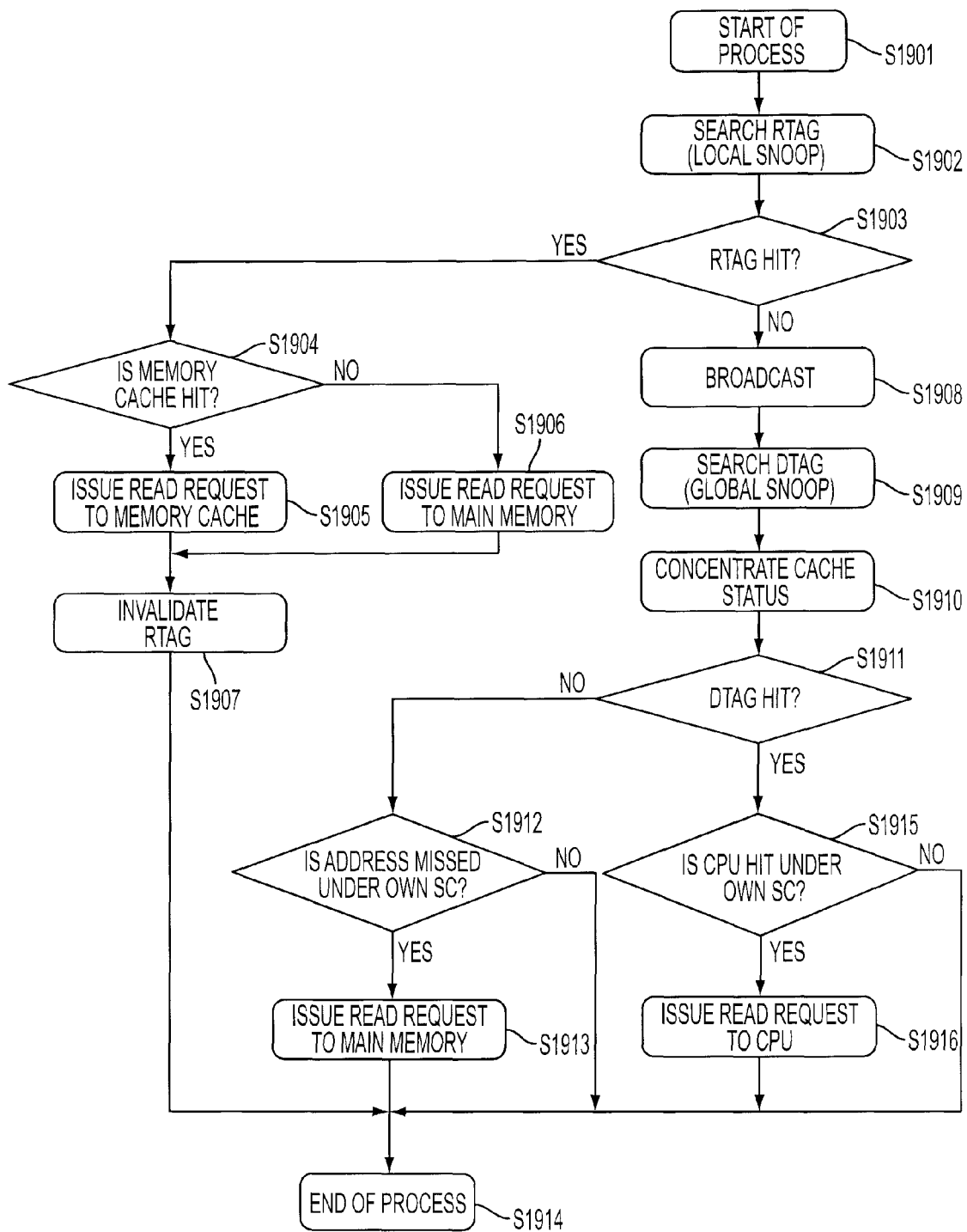
FIG. 19 is a flowchart indicating the first operation example of the system controller LSI (SC) in FIG. 17 and the second operation example of the system controller LSI (SC) in FIG. 18.

Explanation of the Flowchart Indicating the Second Operation Example in the Second Embodiment of the First Embodiment FIG. 19 is the flowchart indicating the first operation example of the system controller LSI (SC) 1703 in FIG. 17 and the second operation example of the system controller LSI (SC) 1803 in FIG. 18. The process sequence in FIG. 19 will be explained below.

First, in step 1901, upon reception of the read request from the CPU, the system controller LSI (SC) starts the process of the relevant read request. Next, in step 1902, the system controller LSI (SC), having received the read request executes the local snoop of the RTAG before execution of the broadcast.

Here, in step 1094 when the RTAG is hit as a result of the local snoop, it is determined whether the object data of the memory access request is hit or not to the memory cache. In step 1905, in this determination, when the memory cache is hit, the local solution can be attained within the local node by issuing the read request to the memory cache. Moreover, in this determination, when the memory cache is not hit, it is apparent that the object data exists in the main memory of the local node. Thus, in step 1906, the local solution can be attained within the local node by issuing the read request to the main memory. Regardless of whether the memory cache is hit or not, the process is completed after execution of invalidation of the tag index for the relevant read request of the RTAG in step 1914.

Next, when the RTAG is not hit in the result of the local snoop, since it is not apparent that the object data of the memory access request exists in the main memory of the local node, the system controller LSI (SC) having received the read request, executes the broadcast, via the interconnect in order to search the object data of the read request. The search occurs not only within the local node but also within the non-local nodes in step 1098. Moreover, in step 1909, the system controller LSI (SC), having executed the broadcast, executes the global snoop by searching the DTAG within the local node through execution of the snoop for the DTAG in the own node. In addition, in step 1910, the system controller LSI (SC) in each node executes the cache status merge by concentrating the search results of the DTAG through transmission and reception thereof via the interconnect.

Here, in step 1911, the system controller LSI (SC), having executed the cache status merge determines whether the DTAG is hit in the search result of the DTAG or not. In step 1915, when the DTAG is hit in the search result of the DTAG, it is determined that the CPU having the data indicating the hit of the DTAG is of the local node. In step 1916, when the CPU having the data indicating a hit of the DTAG is of the local node, a read request of the object data is issued to the relevant CPU. The process is completed after reception of the relevant data in step 1914. Otherwise, when the CPU having the data indicating a hit of the DTAG is not of the node, the process is completed step 1914.

Moreover, when a DTAG miss is generated in the search result of the DTAG, it is determined whether the address including the DTAG miss is within scope of address of the main memory of the local node in step 1912. When the address including the DTAG miss is within the scope of address of the main memory of the local node, a read request of the object data is issued to the relevant main memory step 1913. The process is completed after reception of the object data in step 1914). Otherwise, when the address including the DTAG miss is not in the scope of address of the main memory of the local node, the process is completed in step 1914.

From the explanation of FIG. 3 to FIG. 19, it is clear that the necessary data can be stored in the secondary cache memory of the CPU with only one access. Useless access is never generated in the memory control apparatus including a retention tag (RTAG). Simultaneously receiving and merging data of a plurality of storage devices of the tertiary cache memory (L3-CACHE) and the main memory or the like in response to the read request from the CPU does not have to unnecessarily occur. For example, when response data for the read request issued to the system controller LSI (SC) within the local system board (SB) from the CPU exists through distribution to the main memory (MEM) and the tertiary cache memory (L3-CACHE) or the like within the system controller LSI (SC) on the system board (SB).

The embodiments of the present invention and the operations thereof have been described in detail with reference to the accompanying drawings. The practical structural examples of the present invention are not limited only to such embodiments. The present invention should not be limited to the embodiments described herein. After being presented with the disclosure herein, those of ordinary skill in the art would appreciate that changes may be made to the disclosed embodiments without departing from the spirit and scope of the present invention.

What is claimed is:

1. A memory control apparatus connected to a main memory storing data and a plurality of processors including a cache memory holding a part of the data stored in main memory and executing a data response process for a read request from any one of the plurality of processors, comprising:

retention tags that hold separate data information indicating that data stored in the main memory is not held in any cache memory of the processors connected to the memory control apparatus;

a data tag that hold tag information indicating that data stored in the main memory is held in any one of the cache memory of the processors; and a controller that transfers the read request from any one of the plurality of processors to the main memory when the retention tag is indicating that the data of the read request stored in the main memory is not held in any cache memory of the processors, or transfers the read request from any one of the plurality of processors to the cache memory when the data tag is indicating that the data of the read request is held in the cache memory.

2. A memory control apparatus connected to a main memory and a plurality of processors including a first cache memory holding a part of the data stored in main memory and executing a data response process for a read request from any one of the plurality of processors, comprising:

a second cache memory for holding data included in the main memory, and retention tags that hold separate data information Indicating that data stored in the main memory is not held in any cache memory of the processors connected to the memory control apparatus;

a data tag that hold tag information indicating that data stored in the main memory is held in any one of the cache memory of the processors; and a controller that transfers the read request from any one of the plurality of processors to the main memory when the retention tag is indicating that the data of the read request stored in the main memory is not held in any cache memory of the processors, or transfers the read request from any one of the plurality of processors to the cache memory when the data tag is indicating that the data of the read request is held in the cache memory.

3. An information processing apparatus including a plurality of memory control apparatuses connected to a main memory and a plurality of processors including cache memories holding a part of the data stored in main memory and executing a data response process for a read request from any one of the plurality of processors, the memory control apparatuses comprising retention tags for holding separate data information indicating that data included in the main memory is not included in any cache memory of the processors connected to the memory control apparatus, a data tag that hold tag information indicating that data stored in the main memory is held in any one of the cache memory of the processors, wherein the plurality of memory control apparatuses are coupled with each other via an interconnect; and a controller that transfers the read request from any one of the plurality of processors to the main memory when the retention tag is indicating that the data of the read request stored in the main memory is not held in any cache memory of the processors, or transfers the read request from any one of the plurality of processors to the cache memory when the data tag is indicating that the data of the read request is held in the cache memory.

4. An information processing apparatus including a plurality of memory control apparatuses each connected to a main memory and a plurality of processors including a first cache memory to execute a data response process for a read request from any one of the plurality of processors, the main memory control apparatuses comprising a second cache memory for retention tags holding separate data information indicating that data held in the main memory is not held in any cache memory of the processors connected to the memory control apparatus, a data tag that hold tag information indicating that data stored in the main memory is held in any one of the cache memory of the processors, wherein the plurality of memory control apparatuses are coupled with each other via an interconnect; and a controller that transfers the read request from any one of the plurality of processors to the main memory when the retention tag is indicating that the data of the read request stored in the main memory is not held in any cache memory of the processors, or transfers the read request from any one of the plurality of processors to the cache memory when the data tag is indicating that the data of the read request is held in the cache memory.

5. The memory control apparatus according to claim 4, where the second cache memory holds not only the data included in one main memory connected to the memory control apparatus but also the data included in the other main memory connected to the other memory control apparatus via the interconnect.

6. A memory control method of a memory control apparatus connected to a main memory storing data and a plurality of processors each including a cache memory holding a part of the data stored in the main memory and executing a data response process for a read request from any one of the plurality of processors, comprising:
receiving a read request issued from any one of the plurality of processors,
accessing a retention tag that holds separate data information indicating that data stored in the main memory is not held in any cache memory of the processors connected to the memory control apparatus,
accessing a data tag that holds tag information indicating that data stored in the main memory is held in any one of the cache memory of the processors; and
transferring a read request from any one of the plurality of processors to the main memory when the retention tag is indicating that the data of the read request stored in the main memory is not held in any cache memory of the processors, or transferring the read request to the cache memory when the data tag is indicating that the data of the read request is held in the cache memory.

7. A memory control method of a memory control apparatus having a second cache memory connected to a main memory storing data and a plurality of processors each having a first cache memory and main memories to hold a part of the data stored in the main memory and executing a data response process for a read request from any one of the plurality of processors, comprising:
receiving a read request issued from any one of the plurality of processors,
accessing a retention tag that holds the separate data information indicating that the data stored in the main memory is not held in any cache memory of the processors connected to the memory control apparatus,
accessing a data tag that holds tag information indicating that data stored in the main memory is held in any one of the cache memory of the processors, and
transferring a read request from any one of the plurality of processors to the main memory when the retention tag is indicating that the data of the read request included in the main memory is not held in any cache memory of the processors, or transferring the read request to the cache memory when the data tag is indicating that the data of the read request is held in the cache memory.

8. A memory control method of an information processing apparatus having a plurality of memory control apparatuses connected to a main memory and a plurality of processors each having cache memories and executing a data response process for a read request from any one of the plurality of processors, comprising:
receiving a read request issued from any one of the plurality of processors,
accessing a retention tag that holds separate data information indicating that the data stored in the main memory is not held in any cache memory of the processors connected to the memory control apparatus,
accessing a data tag that holds tag information indicating that data stored in the main memory is held in any one of the cache memory of the processors, and
transferring a read request from any one of the plurality of processors to the main memory when the retention tag is indicating that the data of the read request included in the main memory is not held in any cache memory of the processors, or transferring the read request to the cache memory when the data tag is indicating that the data of the read request is held in the cache memory.

9. A memory control method of an information processing apparatus having a plurality of memory control apparatuses each connected to a main memory and a plurality of processors each having a first cache memory and a second cache memory for holding the data stored in the main memory and executing a data response process for the read request from any one of the plurality of processors, comprising:
receiving a read request issued from any one of the plurality of processors, accessing a retention tag that holds separate data information indicating that the specific data stored in the main memory is not held in any cache memory of the processors connected to the memory control apparatus, accessing a data tag that hold tag information indicating that data stored in the main memory is held in any one of the cache memory of the processors, and transferring a read request from any one of the plurality of processors to the main memory when the retention tag is indicating that the data of the read request included in main memory is not held in any cache memory of the processors, or transferring the read request to the cache memory when the data tag is indicating that the data of the read request is held in the cache memory.

10. The memory control method according to claim 9, characterized in that the second cache memory holds not only the data included in one main memory connected to the memory control apparatus but also the data included in the other main memory connected to the memory control apparatus via an interconnect, and when the data of the read request is included in the retention tags and the data is judged to be the data included in the other main memory in access to the retention tags, a read request is also issued to relevant other main memory.

11. A data storage control method, for a memory control apparatus connected to a main memory and a plurality of processors having cache memories, comprising:

accessing a retention tag storage in response to a data read request from any one of the plurality of processors, wherein the retention tag storage is adapted to hold a retention tag indicating that requested data stored within the main memory is not held in any cache memory of the processors connected to the memory control apparatus;

reading the data from the main memory when the retention tag storage identifies that the data is in the main memory;

accessing a data tag storage in an attempt to locate the data when the retention tag storage fails to identify the data where the data tag storage holds tag information indicating that data stored in the main memory is held in any one of the cache memory of the processors; and transferring a read request from any one of the plurality of processors to the main memory when the retention tag is indicating that the data of the read request included in main memory is not held in any cache memory of the processors, or transferring the read request to the cache memory when the data tag is indicating that the data of the read request is held in the cache memory.

12. The method of claim 11, further comprising issuing a broadcast memory read operation to search for the data when the retention tag storage fails to identify the data.

13. The method of claim 11, further comprising executing a merge operation to merge search results of the accessing the data tag storage when the retention tag storage fails to identify the data.

14. The method of claim 11, further comprising reading the data from another main memory when the data tag indicating that the data is located in the another main memory.

15. The method of claim 11, wherein all accessing operations are snooping operations.

16. The method of claim 11, wherein the accessing the retention tag storage occurs after at least one broadcast memory read operation.

17. The method of claim 16, wherein the reading occurs by a memory control apparatus different than a memory control apparatus responsible for the data read request.

18. The method of claim 11, wherein the reading occurs from a cache memory in which data from a first main memory and a second main memory are held.

19. A data storage controlling apparatus connected to a system controller, comprising, a plurality of cache memories operable from the system controller;

retention tag storage located in the system controller and adapted to indicate that requested data stored within the main memory is not held in any cache memories of processors connected to the control apparatus;

data tag storage located in the system controller and adapted to indicate that the data is held in any one of the plurality of cache memories; and a controller that transfers the read request from any one of the plurality of processors to the main memory when the retention tag is indicating that the data of the read request stored in the main memory is not held in any cache memory of the processors, or transfers the read request from any one of the plurality of processors to the cache memory when the data tag is indicating that the data of the read request is held in the cache memory.

20. The apparatus of claim 19, wherein the retention tag storage indicates that requested data is included in the main memory is not included in any of the plurality of caches memories.

21. The apparatus of claim 19, wherein the retention tag storage includes a plurality of retention tags indicating that data is included in the main memory.

22. The apparatus of claim 19, wherein the data tag storage includes a plurality of data tags identifying that data is included in the plurality of cache memories.

23. The apparatus of claim 19, wherein the retention tag storage and a data tag storage operates via a snoop operation.

24. The apparatus of claim 19, further comprising a memory cache adapted to hold data from a first memory and data from a second memory.

25. The apparatus of claim 24, wherein the memory cache accepts a read operation in response to the retention tag being identified in the retention tag storage.

26. A system for controlling data storage, comprising:

a first system board including a first retention tag storage, a first data tag storage and a first plurality of caches memories and a first main memory;

a second system board including a second retention tag storage, a second data tag storage and a second plurality of caches memories and a second main memory; where the retention tag storages are adapted to hold retention tags indicating that requested data stored within the first main memory on the first system boards or the second main memory on the second system board or not in any cache memories, and where the data tag storages are adapted to hold data tags indicating that data stored in the main memories is held in any one of the cache memories; and a controller that transfers the read request from any one of the plurality of processors to the main memory when the retention tag is indicating that the data of the read request stored in the main memory is not held in any cache memory of the processors, or transfers the read request from any one of the plurality of processors to the cache memory when the data tag is indicating that the data of the read request is held in the cache memory.

* * * * *

UNITED STATES PATENT AND TRADEMARK OFFICE
CERTIFICATE OF CORRECTION

| | | |
|---|---|---|
| PATENT NO. | : 8,032,717 B2 | Page 1 of 1 |
| APPLICATION NO. | : 11/298445 | |
| DATED | : October 4, 2011 | |
| INVENTOR(S) | : Shigekatsu Sagi | |

It is certified that error appears in the above-identified patent and that said Letters Patent is hereby corrected as shown below:

Column 22, Line 47, In Claim 26, delete "memory;" and insert --memory--, therefor.

Signed and Sealed this
Twentieth Day of December, 2011

David J. Kappos
*Director of the United States Patent and Trademark Office*